(12) United States Patent
Ma et al.

(10) Patent No.: US 7,702,831 B2
(45) Date of Patent: Apr. 20, 2010

(54) FLASH MEMORY CONTROLLER FOR ELECTRONIC DATA FLASH CARD

(75) Inventors: Abraham C. Ma, Fremont, CA (US); Charles C. Lee, Cupertino, CA (US); I-Kang Yu, Palo Alto, CA (US); Edward W. Lee, Mountain View, CA (US); Ming-Shiang Shen, Taipei Hsien (TW)

(73) Assignee: Super Talent Electronics, Inc., San Jose, CA (US)

( * ) Notice: Subject to any disclaimer, the term of this patent is extended or adjusted under 35 U.S.C. 154(b) by 170 days.

(21) Appl. No.: 11/466,759

(22) Filed: Aug. 23, 2006

(65) Prior Publication Data
US 2010/0030961 A9  Feb. 4, 2010

Related U.S. Application Data

(63) Continuation-in-part of application No. 09/478,720, filed on Jan. 6, 2000, now Pat. No. 7,257,714, and a continuation-in-part of application No. 10/761,853, filed on Jan. 20, 2004, now abandoned, and a continuation-in-part of application No. 10/789,333, filed on Feb. 26, 2004, now Pat. No. 7,318,117.

(51) Int. Cl.
  *G06F 13/12* (2006.01)
(52) U.S. Cl. .................................. 710/74; 710/52
(58) Field of Classification Search ............ 710/52–57, 710/74
  See application file for complete search history.

(56) References Cited
U.S. PATENT DOCUMENTS
4,582,985 A  4/1986  Lofberg
4,630,201 A  12/1986  White (Continued)

FOREIGN PATENT DOCUMENTS

JP  63-163589 A  7/1988

(Continued)

OTHER PUBLICATIONS

USB Implementers Forum. "Bulk-Only Transport," USB Device Class Definition for Mass Storage Devices, Revision 1.0, 1999. http://www.usb.org/developers/devclass_docs/usbmassbulk_10.pdf.

*Primary Examiner*—Eron J Sorrell
(74) *Attorney, Agent, or Firm*—Bever, Hoffman & Harms, LLP; Patrick T. Bever

(57) ABSTRACT

An electronic data flash card is accessible by a host computer, and includes a processing unit connected to a flash memory device that stores a data file, and an input-output interface circuit activated so as to establish a communication with the host computer. In an embodiment, the electronic data flash card uses a USB input/output interface circuit for communication with the host computer. A flash memory controller includes an index for converting logical addresses sent by the host computer into physical addresses associated with sectors of the flash memory device. The index is controlled by arbitration logic referencing to values from various look up tables and valid data stored in the flash memory device. The flash memory controller further includes a first-in-first-out unit (FIFO) for recycling obsolete sectors of the flash memory device in the background process so that they are available for reprogramming.

10 Claims, 17 Drawing Sheets

U.S. PATENT DOCUMENTS

| | | | |
|---|---|---|---|
| 4,766,293 A | 8/1988 | Boston | |
| 4,926,480 A | 5/1990 | Chaum | |
| 5,020,105 A | 5/1991 | Rosen et al. | |
| 5,180,901 A | 1/1993 | Hiramatsu | |
| 5,280,527 A | 1/1994 | Gullman et al. | |
| 5,404,485 A * | 4/1995 | Ban | 711/202 |
| 5,438,359 A | 8/1995 | Aoki | |
| 5,479,638 A | 12/1995 | Assar et al. | |
| 5,502,797 A | 3/1996 | Bush et al. | |
| 5,559,956 A | 9/1996 | Sukegawa | |
| 5,596,738 A | 1/1997 | Pope | |
| 5,623,552 A | 4/1997 | Lane | |
| 5,675,833 A | 10/1997 | Radko et al. | |
| 5,860,082 A | 1/1999 | Smith et al. | |
| 5,936,884 A * | 8/1999 | Hasbun et al. | 365/185.03 |
| 5,959,541 A | 9/1999 | DiMaria et al. | |
| 6,000,006 A | 12/1999 | Bruce et al. | |
| 6,012,636 A | 1/2000 | Smith | |
| 6,069,920 A | 5/2000 | Schulz et al. | |
| 6,069,970 A | 5/2000 | Salatino et al. | |
| 6,125,192 A | 9/2000 | Bjorn et al. | |
| 6,145,069 A * | 11/2000 | Dye | 711/170 |
| 6,148,354 A * | 11/2000 | Ban et al. | 710/301 |
| 6,193,152 B1 | 2/2001 | Fernando et al. | |
| 6,272,628 B1 | 8/2001 | Aguilar et al. | |
| 6,321,478 B1 | 11/2001 | Klebes | |
| 6,354,858 B1 | 3/2002 | Cooper et al. | |
| 6,381,176 B1 | 4/2002 | Kim et al. | |
| 6,405,362 B1 | 6/2002 | Shih et al. | |
| 6,547,130 B1 | 4/2003 | Shen | |
| 6,609,187 B1 | 8/2003 | Merrell et al. | |
| 6,633,949 B2 | 10/2003 | Kuo et al. | |
| 6,718,407 B2 | 4/2004 | Martwick | |
| 6,725,321 B1 | 4/2004 | Sinclair et al. | |
| 6,823,435 B1 | 11/2004 | Wisor | |
| 6,886,104 B1 | 4/2005 | McClurg et al. | |
| 6,965,963 B1 | 11/2005 | Nakanishi et al. | |
| 7,069,370 B2 * | 6/2006 | Sukegawa et al. | 710/305 |
| 7,188,228 B1 | 3/2007 | Chang et al. | |
| 7,257,714 B1 | 8/2007 | Shen | |
| 2001/0043174 A1 | 11/2001 | Jacobsen et al. | |
| 2002/0036922 A1 | 3/2002 | Roohparvar | |
| 2002/0166023 A1 | 11/2002 | Nolan et al. | |
| 2002/0166059 A1 | 11/2002 | Rickey et al. | |
| 2003/0046510 A1 | 3/2003 | North | |
| 2003/0163656 A1* | 8/2003 | Ganton | 711/154 |
| 2003/0177300 A1* | 9/2003 | Lee et al. | 711/103 |
| 2003/0182528 A1* | 9/2003 | Ajiro | 711/167 |
| 2003/0221083 A1 | 11/2003 | Hill et al. | |
| 2004/0139290 A1 | 7/2004 | Wolrich et al. | |
| 2004/0148482 A1 | 7/2004 | Grundy et al. | |
| 2004/0195339 A1 | 10/2004 | Chen et al. | |
| 2004/0236936 A1 | 11/2004 | Bulusu et al. | |
| 2004/0255054 A1 | 12/2004 | Pua et al. | |
| 2005/0060528 A1 | 3/2005 | Kim | |
| 2005/0083741 A1 | 4/2005 | Chang et al. | |
| 2005/0114587 A1 | 5/2005 | Chou et al. | |
| 2005/0182858 A1 | 8/2005 | Lo et al. | |
| 2005/0193161 A1 | 9/2005 | Lee et al. | |
| 2005/0193162 A1 | 9/2005 | Chou et al. | |
| 2005/0216624 A1 | 9/2005 | Deng et al. | |
| 2005/0268339 A1 | 12/2005 | Bobrow | |
| 2005/0283598 A1 | 12/2005 | Gaskins et al. | |
| 2006/0075395 A1 | 4/2006 | Lee et al. | |
| 2006/0173980 A1 | 8/2006 | Kobayashi et al. | |
| 2008/0147964 A1 | 6/2008 | Chow et al. | |

FOREIGN PATENT DOCUMENTS

| | | |
|---|---|---|
| JP | 02-118790 A | 5/1990 |
| JP | 11-039483 | 2/1999 |

* cited by examiner

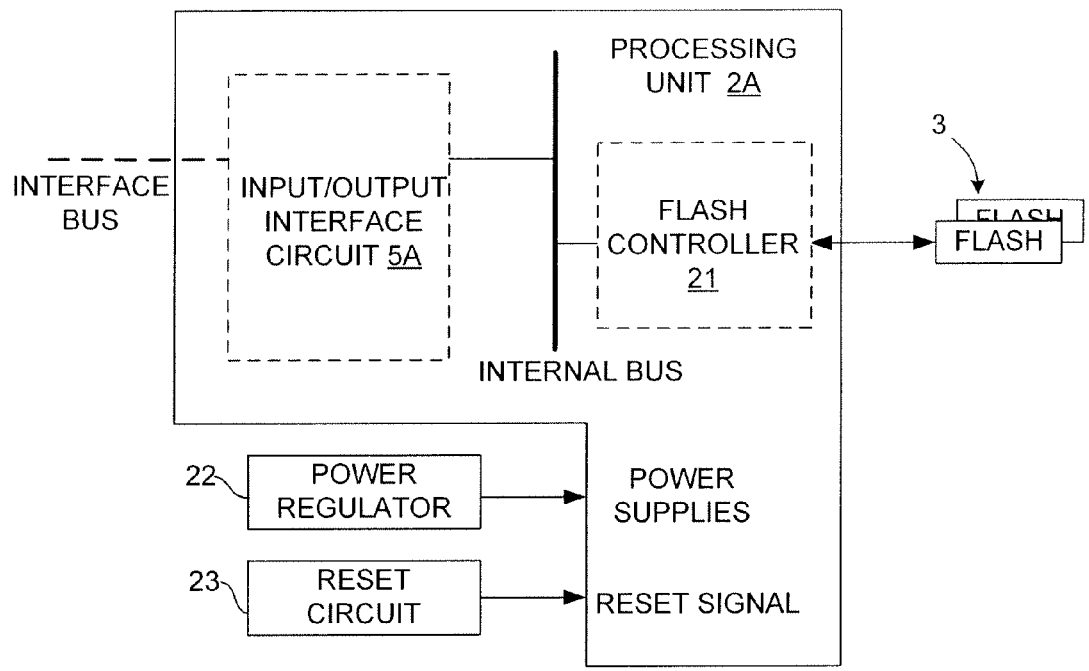
FIG. 3
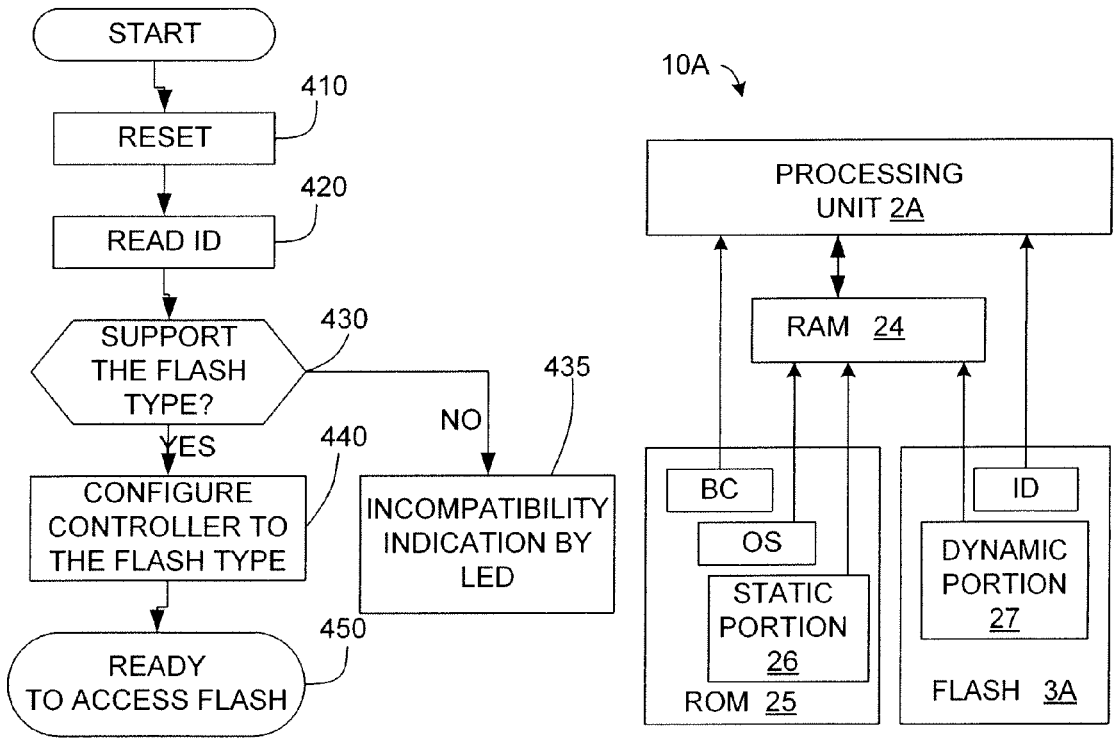
FIG. 4A
FIG. 4B

702

| Byte \ bit | 7 | 6 | 5 | 4 | 3 | 2 | 1 | 0 |
|---|---|---|---|---|---|---|---|---|
| 0 - 3 | CBW Signature (43 42 53 55h, 55 is byte 0) | | | | | | | |
| 4 - 7 | CBW Tag | | | | | | | |
| 8 - 11 (08h - 0Bh) | CBW Data Transfer Length | | | | | | | |
| 12 (0Ch) | CBW Flags | | | | | | | |
| 13 (0Dh) | 0h (Reserved) | | | | | CBW LUN | | |
| 14 (0Eh) | 0h (Reserved) | | | | CBW CB Length | | | |
| 15 - 30 (0Fh - 1Eh) | CBW CB | | | | | | | |

FIG. 12A

| Byte \ bit | 7 | 6 | 5 | 4 | 3 | 2 | 1 | 0 |
|---|---|---|---|---|---|---|---|---|
| 0 | \multicolumn{8}{c}{Operation Code (28h as read example)} |
| 1 | \multicolumn{4}{c}{Reserved} | \multicolumn{4}{c}{Service Action} |
| 2 | MSB | | | | | | | |
| 3 | | | | | | | | |
| 4 | \multicolumn{8}{c}{LBA} |
| 5 | \multicolumn{8}{c}{(Logical Block Address)   LSB} |
| 6 | \multicolumn{8}{c}{Reserved} |
| 7 | MSB | \multicolumn{7}{c}{Transfer Length (unit is sector)} |
| 8 | \multicolumn{8}{c}{LSB} |
| 9 | \multicolumn{8}{c}{Control (00h)} |

| Byte \ bit | 7 | 6 | 5 | 4 | 3 | 2 | 1 | 0 |
|---|---|---|---|---|---|---|---|---|
| 0 - 3 | \multicolumn{8}{c}{CSW Signature (53 42 53 55h, 55h is byte 0)} |
| 4 - 7 | \multicolumn{8}{c}{CSW Tag} |
| 8 - 11 (08h - 0Bh) | \multicolumn{8}{c}{CSW Data Transfer Length} |
| 12 (0Ch) | \multicolumn{8}{c}{CSW Flags} |

FLASH MEMORY CONTROLLER FOR ELECTRONIC DATA FLASH CARD

RELATED APPLICATIONS

This application is a continuation-in-part of U.S. Patent application for "ELECTRONIC DATA STORAGE MEDIUM WITH FINGERPRINT VERIFICATION CAPABILITY", U.S. application Ser. No. 09/478,720, filed Jan. 6, 2000, a continuation-in-part of U.S. Patent application for "ELECTRONIC DATA FLASH CARD WITH FINGERPRINT VERIFICATION CAPABILITY", U.S. application Ser. No. 11/458,987, filed Jul. 20, 2006, which is a continuation-in-part of U.S. patent application for "HIGHLY INTEGRATED MASS STORAGE DEVICE WITH AN INTELLIGENT FLASH CONTROLLER", U.S. application Ser. No. 10/761,853, filed Jan. 20, 2004, and a continuation-in-part of U.S. Patent application for "SYSTEM AND METHOD FOR CONTROLLING FLASH MEMORY", U.S. application Ser. No. 10/789,333, filed Feb. 26, 2004.

FIELD OF THE INVENTION

The invention relates to electronic data flash cards, more particularly to a system and method for controlling flash memory in an electronic data flash card.

BACKGROUND OF THE INVENTION

Confidential data files are often stored in floppy disks or are delivered via networks that require passwords or that use encryption coding for security. Confidential documents are sent by adding safety seals and impressions during delivery. However, confidential data files and documents are exposed to the danger that the passwords, encryption codes, safety seals and impressions may be broken (deciphered), thereby resulting in unauthorized access to the confidential information.

As flash memory technology becomes more advanced, flash memory is replacing traditional magnetic disks as storage media for mobile systems. Flash memory has significant advantages over floppy disks or magnetic hard disks such as having high-G resistance and low power dissipation. Because of the smaller physical size of flash memory, they are also more conducive to mobile systems. Accordingly, the flash memory trend has been growing because of its compatibility with mobile systems and low-power feature. However, advances in flash technology have created a greater variety of flash memory device types that vary for reasons of performance, cost and capacity. As such, a problem arises when mobile systems that are designed for one type of flash memory are constructed using another, incompatible type of flash memory.

New generation personal computer (PC) card technologies have been developed that combine flash memory with architecture that is compatible with the Universal Serial Bus (USB) standard. This has further fueled the flash memory trend because the USB standard is easy to implement and is popular with PC users. In addition to replacing hard drives, flash memory is also replacing floppy disks because flash memory provides higher storage capacity and faster access speeds than floppy drives.

However, the USB standard has several features that require additional processing resources. These features include fixed-frame times, transaction packets, and enumeration processes. For better optimization, these features have been implemented in application-specific integrated circuits (ASICs).

A problem with USB mass-storage devices is that they are slow. The USB interface is significantly slower than IDE (Integrated Drive Electronics) interface in particular. This is because of the overhead associated with the USB standard, which include additional resources required for managing USB commands and handshake packets. Bulk-only transactions introduced by the USB standard have relieved some resources but only if the USB traffic is not too busy.

In addition to the limitations introduced by the USB standard, there are inherent limitations with flash memory. First, flash memory sectors that have already been programmed must be erased before being reprogrammed. Also, flash memory sectors have a limited life span; i.e., they can be erased only a limited number of times before failure. Accordingly, flash memory access is slow due to the erase-before-write nature and ongoing erasing will damage the flash memory sectors over time.

To address the speed problems with USB-standard flash memory, hardware and firmware utilize existing small computer systems interface (SCSI) protocols so that flash memory can function as mass-storage devices similarly to magnetic hard disks. SCSI protocols have been used in USB-standard mass-storage devices long before flash memory devices have been widely adopted as storage media. Accordingly, the USB standard has incorporated traditional SCSI protocols to manage flash memory.

A problem with SCSI protocols is that they do not include an erase command to address the erase-before-write nature of flash memory. Accordingly, the erase operation is handled by the host system, which further ties up the host system resources.

Some solutions have been introduced that involve new USB packet definitions such as write flash, read flash, and erase flash definitions. However, these definitions are not an efficient way to handle flash memory because they introduce additional protocols that require additional computing resources at the host system. They also do not address the sector-wear issues.

Another solution provides a driver procedure for flash memory write transactions. This procedure has three different sub-procedures. Generally, the data of a requested flash memory address is first read. If there is data already written to that address, the firmware executes an erase command. Then, if the erase command executes correctly, the firmware executes a write request. However, this driver procedure utilizes protocols that require additional computing resources at the host system.

Another solution provides a flash sector format that has two fields: a data field and a spare field. The spare field contains control data that include flags that facilitate in the management of the sectors. However the flags introduce ASIC complexity when the host system writes to the sectors.

Disadvantages of many of the above-described and other known arrangements include additional host system resources required to process special protocols and the resulting added processing time required for managing flash memory.

Accordingly, what is needed is an electronic data flash card that includes an intelligent processing unit for flexible flash memory type support.

What is also needed is an improved system and method for controlling flash memory. The system and method should be able to comply with the USB standard, should be suitable for ASIC hardware implementation, and should be simple, cost effective and capable of being easily adapted to existing technology.

SUMMARY OF THE INVENTION

The present invention is generally directed to an electronic data flash card including a flash memory device, a fingerprint sensor, an input-output interface circuit and a processing unit. The electronic data flash card is adapted to be accessed by a host (external) computer such as a personal computer, notebook computer or other electronic host device. As an electronic data flash card is easier to carry and durable for ruggedness, personal data can be stored inside the flash memory device in an encrypted form such that it can only be accessed, for example, by way of a fingerprint sensor associated with card body to make sure unauthorized person cannot misuse the card.

In accordance with an aspect of the invention, a flash memory controller is part of the processing unit to control the operation of the flash memory device. The processing unit is connected to the flash memory device and the input/output interface circuit. The flash memory controller logic includes a flash type algorithm for detecting whether the flash memory device is of a flash type that is supported by the flash memory controller logic. By storing the dynamic portion of the flash detection algorithm code along with the confidential data in at least one flash memory device, not only can the ROM size of the electronic data flash card be reduced, but new flash types can be supported without hardware alteration simply by changing the dynamic portion of the flash detection algorithm stored in the flash memory. The overall cost is reduced and the unnecessary development time is also eliminated.

In accordance with another embodiment of the present invention, the processing unit of an electronic data flash card is operable selectively in a programming mode, a data retrieving mode, and a resetting mode. When the processing unit is in the programming mode, the processing unit activates the input/output interface circuit to receive the confidential data file from the host computer, and to store the data file in the flash memory device. When the processing unit is in the data retrieving mode, the processing unit activates the input/output interface circuit to transmit the data file to the host computer. In the data resetting mode, the data file (and the reference fingerprint data) is/are erased from the flash memory device.

In one embodiment, the processing unit is a microprocessor including one of an 8051, 8052, 80286, RISC, ARM, MIPS or digital signal processor.

In accordance with an embodiment of the present invention, the input/output (I/O) interface circuit is a USB interface circuit.

In accordance with another embodiment of the present invention, a USB flash device transfers high-speed data between computers using only the Bulk-Only Transfer (BOT) protocol. BOT is a more efficient and faster transfer protocol than command/bulk/interrupt (CBI) protocol because BOT transport of command, data, status rely on Bulk endpoints in addition to default Control endpoints.

In accordance with another embodiment of the present invention, the flash memory controller includes a processor for receiving at least one request from a host system. The flash memory controller further includes an index including information regarding sectors of a flash memory. The processor utilizes the index to determine the sectors of the flash memory that are available for programming, reprogramming, or reading. In another aspect of the present invention, the flash memory controller further includes a first-in-first-out unit (FIFO) for recycling obsolete sectors so that they are available for reprogramming.

According to the system and method disclosed herein, the host system interacts with the flash memory controller without the host system having information regarding the configuration of the flash memory. Consequently, speeds at which data is written to and read from flash memory is significantly increased while the flash memory remains compatible with the USB standard and ASIC architecture.

BRIEF DESCRIPTION OF THE DRAWING

Other features and advantages of the present invention will become apparent in the following detailed description of the preferred embodiment with reference to the accompanying drawings, of which:

FIG. 3 is a block diagram of a processing unit utilized in an electronic data flash card in accordance with another embodiment of the present invention.

FIG. 4A is a flow chart showing a process for detecting a flash memory type in accordance with an embodiment of the present invention.

FIG. 4B is a block diagram showing a portion of an electronic data flash card according to another embodiment of the present invention.

FIGS. 12A, 12B and 12C are block diagrams showing a command block wrapper, a reduced block command read format, and a command status wrapper in accordance with the present invention.

DETAILED DESCRIPTION

Figure 1:
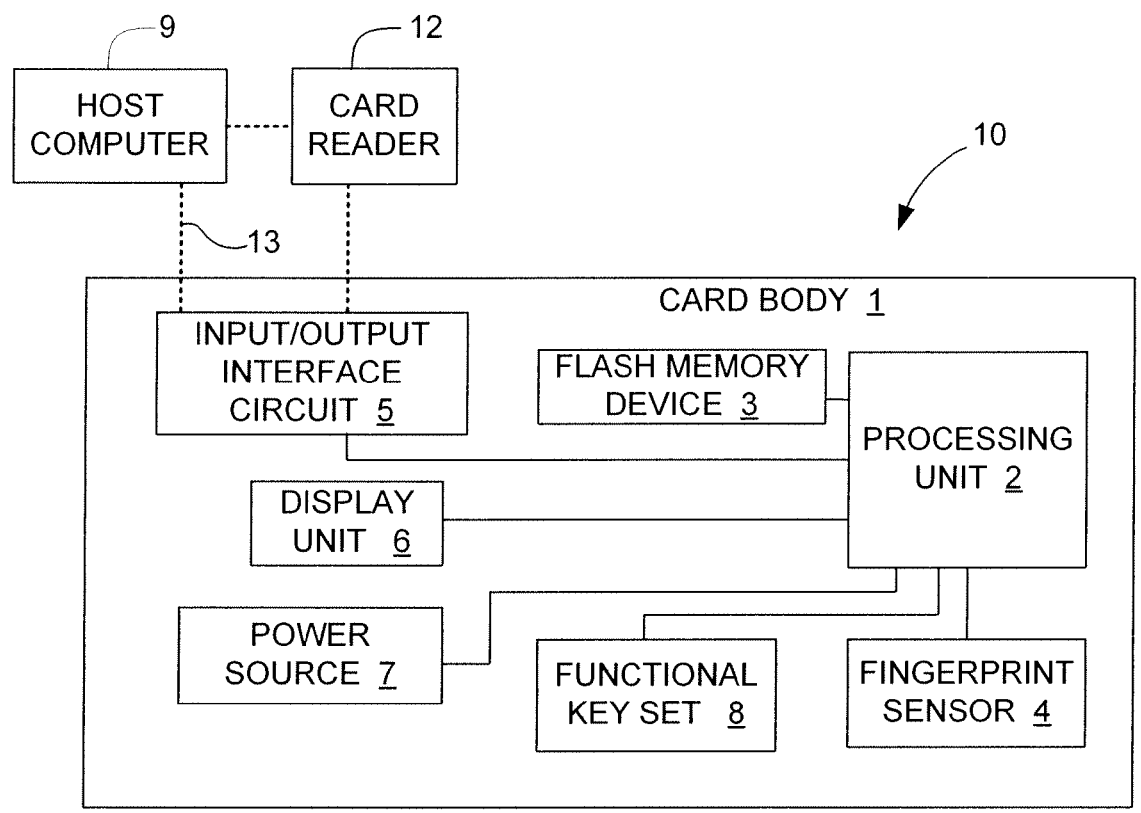
FIG. 1 is a block diagram showing an electronic data flash card with fingerprint verification capability in accordance with an embodiment of the present invention.

Referring to FIG. 1, according to an embodiment of the present invention, an electronic data flash card 10 is adapted to be accessed by an external (host) computer 9 either via an interface bus 13 or a card reader 12 or other interface mechanism (not shown), and includes a card body 1, a processing unit 2, one or more flash memory devices 3, a fingerprint sensor 4, an input/output interface circuit 5, an optional display unit 6, an optional power source (e.g., battery) 7, and an optional function key set 8.

Flash memory device 3 is mounted on the card body 1, stores in a known manner therein one or more data files, a reference password, and the reference fingerprint data obtained by scanning a fingerprint of one or more authorized users of the electronic data flash card 10. Only authorized users can access the stored data files. The data file can be a picture file or a text file.

The fingerprint sensor 4 is mounted on the card body 1, and is adapted to scan a fingerprint of a user of electronic data flash card 10 to generate fingerprint scan data. One example of the fingerprint sensor 4 that can be used in the present invention is that disclosed in a co-owned U.S. Pat. No. 6,547,130, entitled "INTEGRATED CIRCUIT CARD WITH FINGERPRINT VERIFICATION CAPABILITY", the entire disclosure of which is incorporated herein by reference. The fingerprint sensor described in the above patent includes an array of scan cells that defines a fingerprint scanning area. The fingerprint scan data includes a plurality of scan line data obtained by scanning corresponding lines of array of scan cells. The lines of array of scan cells are scanned in a row direction as well as column direction of said array. Each of the scan cells generates a first logic signal upon detection of a ridge in the fingerprint of the holder of card body, and a second logic signal upon detection of a valley in the fingerprint of the holder of card body.

The input/output interface circuit 5 is mounted on the card body 1, and can be activated so as to establish communication with the host computer 9 by way of an appropriate socket via an interface bus 13 or a card reader 12. In one embodiment, input/output interface circuit 5 includes circuits and control logic associated with a Universal Serial Bus (USB), PCMCIA or RS232 interface structure that is connectable to an associated socket connected to or mounted on the host computer 9. In another embodiment, the input/output interface circuit 5 may include one of a Secure Digital (SD) interface circuit, a Multi-Media Card (MMC) interface circuit, a Compact Flash (CF) interface circuit, a Memory Stick (MS) interface circuit, a PCI-Express interface circuit, a Integrated Drive Electronics (IDE) interface circuit, and a Serial Advanced Technology Attachment (SATA) interface circuit, which interface with the host computer 9 via an interface bus 13 or a card reader 12.

The processing unit 2 is mounted on the card body 1, and is connected to the flash memory device 3, the fingerprint sensor 4 and the input/output interface circuit 5 by way of associated conductive traces or wires disposed on card body 1. In one embodiment, processing unit 2 is one of an 8051, 8052, 80286 microprocessors available, for example, from Intel Corporation. In other embodiments, processing unit 2 includes a RISC, ARM, MIPS or other digital signal processors (DSP). In accordance with an aspect of the present invention, processing unit 2 is controlled by a program stored at least partially in flash memory device 3 such that processing unit 2 is operable selectively in: (1) a programming mode, where the processing unit 2 activates the input/output interface circuit 5 to receive the data file and the reference fingerprint data from the host computer 9, and to store the data file and the reference fingerprint data in flash memory device 3; (2) a data retrieving mode, where the processing unit 2 activates the input/output interface circuit 5 to transmit the data file stored in flash memory device 3 to the host computer 9; and (3) a data resetting mode, where the data file and the reference finger data are erased from the flash memory device 3. In operation, host computer 9 sends write and read requests to electronic data flash card 10 via interface bus 13 or a card reader 12 and input/output interface circuit 5 to the processing unit 2, which in turn utilizes a flash memory controller (not shown) to read from or write to the associated one or more flash memory devices 3. In one embodiment, for further security protection, the processing unit 2 automatically initiates operation in the data resetting mode upon detecting that a preset time period has elapsed since the last authorized access of the data file stored in the flash memory device 3.

The optional power source 7 is mounted on the card body 1, and is connected to the processing unit 2 and other associated units on card body 1 for supplying electrical power thereto.

The optional function key set 8, which is mounted on the card body 1, is connected to the processing unit 2, and is operable so as to initiate operation of processing unit 2 in a selected one of the programming, data retrieving and data resetting modes. The function key set 8 is operable to provide an input password to the processing unit 2. The processing unit 2 compares the input password with the reference password stored in the flash memory device 3, and initiates authorized operation of electronic data flash card 10 upon verifying that the input password corresponds with the reference password.

The optional display unit 6 is mounted on the card body 1, and is connected to and controlled by the processing unit 2 for showing the data file exchanged with the host computer 9 and for displaying the operating status of the electronic data flash card 10.

The following are some of the advantages of the present invention: first, the electronic data flash card has a small volume but a large storage capability, thereby resulting in convenience during data transfer; and second, because everyone has a unique fingerprint, the electronic data flash card only permits authorized persons to access the data files stored therein, thereby resulting in enhanced security.

Additional features and advantages of the present invention are set forth below.

Figure 2:
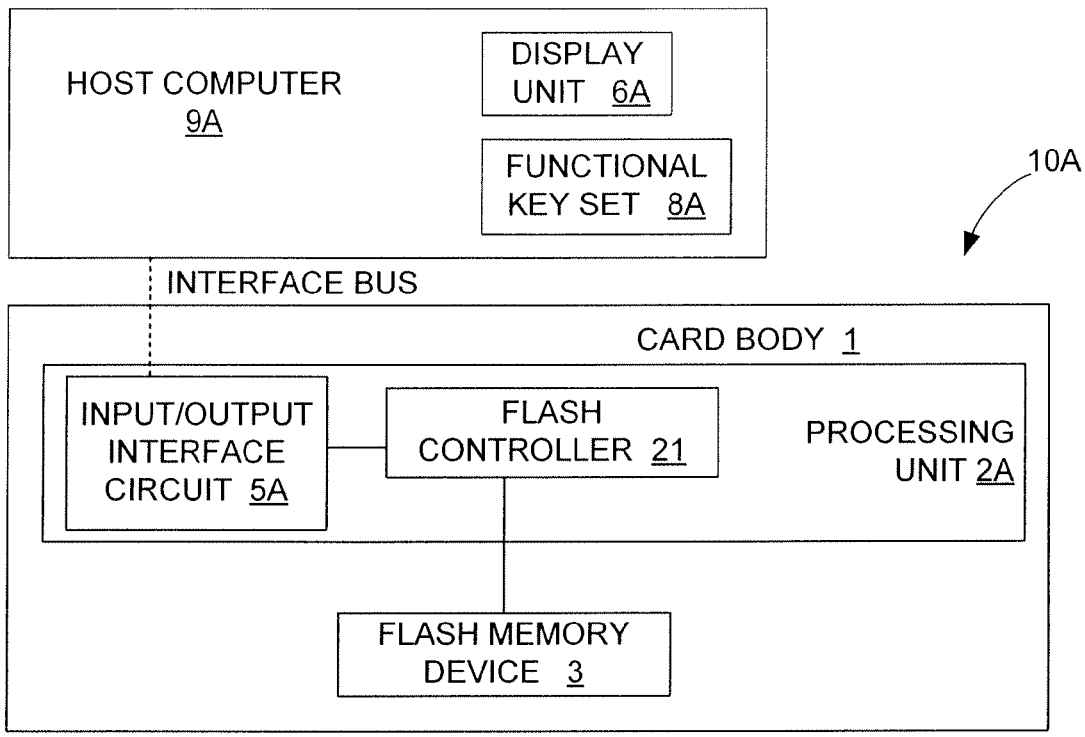
FIG. 2 is a schematic circuit block diagram illustrating an electronic data flash card according to another embodiment of the present invention.

FIG. 2 is a block diagram of an electronic data flash card 10A in accordance with an alternative embodiment of the present invention that omits the fingerprint sensor and the associated user identification process. The electronic data flash card 10A includes a highly integrated processing unit 2A including an input/output interface circuit 5A and a flash memory controller 21 for integration cost reduction reasons. Input/output interface circuit 5A includes a transceiver block, a serial interface engine block, data buffers, registers and interrupt logic. Input/output interface circuit 5A is coupled to an internal bus to allow for the various elements of input/output interface circuit 5A to communicate with the elements of flash memory controller 21. Flash memory controller 21 includes a microprocessor unit, a ROM, a RAM, flash memory controller logic, error correction code logic, and general purpose input/output (GPIO) logic. In one embodiment, the GPIO logic is coupled to a plurality of LEDs for status indication such as power good, read/write flash activity, etc., and other I/O devices. Flash memory controller 21 is coupled to one or more flash memory devices 3.

In this embodiment, host computer 9A includes a function key set 8A, is connected to the processing unit 2A via an interface bus or a card reader when electronic data flash card 10A is in operation. Function key set 8A is used to selectively set electronic data flash card 10A in one of the programming, data retrieving and data resetting modes. The function key set 8A is also operable to provide an input password to the host computer 9A. The processing unit 2A compares the input password with the reference password stored in the flash memory device 3, and initiates authorized operation of electronic data flash card 10A upon verifying that the input password corresponds with the reference password.

Also in this embodiment, a host computer 9A includes display unit 6A, is connected to the processing unit 2A when electronic data flash card 10A is in operation via an interface bus or a card reader. Display unit 6A is used for showing the data file exchanged with the host computer 9A, and for showing the operating status of the electronic data flash card 10A.

FIG. 3 shows processing unit 2A in additional detail. Electronic data flash card 10A includes a power regulator 22 for providing one or more power supplies to processing unit 2A. The power supplies provide different voltages to associated units of electronic data flash card 10A according to the power requirements. Capacitors (not shown) may be required for power stability. Electronic data flash card 10A includes a reset circuit 23 for providing a reset signal to processing unit 2A. Upon power up, reset circuit 23 asserts reset signal to all units. After internal voltages reach a stable level, the reset signal is then de-asserted, and resisters and capacitors (not shown) are provided for adequate reset timing adjustment. Electronic data flash card 10A also includes a quartz crystal oscillator (not shown) to provide the fundamental frequency to a PLL within processing unit 2A.

In accordance with an embodiment of the invention, input/output interface circuit 5A, reset circuit 23, and power regulator 22 are integrated or partially integrated within processing unit 2A. The high integration substantially reduces the overall space needed, the complexity, and the cost of manufacturing.

Compactness and cost are key factors to removable devices such as the electronic data flash cards described herein. Modern IC packaging can integrate discrete IC components with different technology and material into one IC package. For example, the input/output interface circuit is analog and digital mixed circuitry, which can be integrated into the MCP (Multi-Chip Package) package with the processing unit. The reset circuit and power regulator are analog circuitry, which can also be integrated into the MCP (Multi-Chip Package) package with the processing unit.

The nature of mixed signal IC technology allows the hybrid integration of both analog and digital circuitry. Therefore, higher integration can be incorporated into the same die for processing unit 2A which includes input/output interface circuit 5A, flash memory controller 21, reset circuit 23 and power regulator 22.

In an alternative embodiment, a processing unit 2, input/output interface circuit 5, and power regulator 22 and a reset circuit 23 are integrated or partially integrated using Multi-Chip Package technology or mixed signal IC technology.

Advances in flash technology have created a greater variety of flash memory device types that vary for reasons of performance, cost and capacity. For example, Multi Bit Cell (MBC) Flash memory devices have higher capacity than Single Bit Cell (SBC) flash memory devices for the same form factor. AND or Super-AND flash memory have been created to circumvent intellectual property issues associated with NAND flash memory. Also, a large page size (2K Bytes) flash memory has better write performance against a small page size (512 Bytes) flash memory. Further, the rapid development of flash memory has resulted in devices with higher capacities. To support these various flash memory types, the flash memory controller must be able to detect and access them accordingly.

Due to the potential shortage, cost reason, the need for sourcing flexibility of flash memories, and the fact that unique control is required to access each different flash type, it is important to implement a processing unit with intelligent algorithm to detect and access the different flash memory device types.

Typical flash memory devices contains ID code which identifies the flash type, the manufacturer, and the features of the flash memory such as page size, block size organization, capacity, etc. In accordance with an embodiment of the present invention, the processing unit of an electronic data flash card performs a flash detection operation at system power up to determine whether the one or more flash memory devices of the electronic data flash card are supported by the existing flash memory controller.

FIG. 4A illustrates a flash detection algorithm in accordance with the present invention. First, the processing unit is reset (block 410). Next, the ID of the flash memory is read to identify the flash memory type (block 420). The read ID is then compared against the table of flash types that are supported by the existing flash memory controller (block 430). If the flash type is not supported (block 435), the flash memory controller will not be able to access the flash memory, and the incompatibility can be indicated by LED via an output port of the controller. If the flash type is supported, the flash memory controller will be configured to the access mode corresponding to that detected flash type (block 440), and then the flash memory controller begins accessing the flash memory (block 450).

Electronic data flash cards are flash memory systems using flash memories for data storage. For example, as indicated in FIG. 4B, electronic data flash card 10A includes processing unit 2A, flash memory 3A, random-access memory (RAM) 24, and read-only memory (ROM) 25, with the boot code (BC) and operating system (OS) code residing in ROM 25. Upon power up, processing unit 2A fetches and executes the boot code from ROM 25, which initializes the system components and loads the OS code from ROM 25 into RAM 24. Once the OS code is loaded into the RAM 24, it takes control of the system. The OS includes drivers to perform basic tasks such as controlling and allocating memory, prioritizing the processing of instructions, controlling input and output ports etc. The OS code also includes the flash detection algorithm code and the flash parametric data.

Because of the permanent nature of data stored in a ROM, after the flash memory controller of a conventional electronic data flash card is designed and put into production, the software in ROM is frozen and cannot be changed to support new flash types released to the market at a later time. In such a situation, the development of a new flash memory controller has to support new flash memories from time to time, which is costly and time consuming.

Referring again to FIG. 4B, in accordance with another embodiment of the present invention, electronic data flash card 10A includes a flash detection algorithm code that is separated into a static portion 26 and a dynamic portion 27, with the static portion 26 handling contemporary flash memories, and the dynamic portion 27 taking control of the detection process after the static portion fails to identify the particular flash memory device implemented in the electronic data flash card. That is, when electronic data flash card 10A is manufactured using an "old" type flash memory device, then the flash detection algorithm code recognizes the flash device ID during the power up process, and utilizes static portion 26 to execute read and write the "old" type flash memory device. Conversely, when a particular electronic data flash card having the novel configuration is manufactured using a "new" type flash memory device (e.g., 3A, shown in FIG. 4B), then the flash detection algorithm code recognizes the flash device ID during the power up process, and utilizes dynamic portion 27 to execute read and write operations to "new" type flash memory device 3A. With this configuration, static portion 26 of the flash detection algorithm code is stored in ROM 25, but dynamic portion 27 of the flash detection algorithm code is stored in at least one flash memory device 3A of electronic data flash card 10A. By storing dynamic portion 27 along with data (not shown) in at least one flash memory device 3A, not only can the size of ROM 25 be reduced, new flash types can be supported without hardware alteration. That is, if at some point the decision is made to implement a "new" flash memory type (i.e., that is not supported by the static portion), instead of having to replace the entire ROM, the process simply requires storing a suitable dynamic portion of the flash algorithm code in the one or more flash memory device. Because the default access and reading of the dynamic portion is already incorporated into execution of the flash detection algorithm code, the content of the dynamic portion can be altered without affecting operation of the flash detection algorithm code. Thus, overall manufacturing costs are reduced, and unnecessary development time is also eliminated.

Because data storing and reading in a flash memory device is necessary for access and verification purpose, speed is also a major concern of the device performance. According to additional aspects of the present embodiment set forth below, a method of dual-channel parallel and interleave access flash is implemented in an electronic data flash card for faster performance than is possible using conventional methods.

Figure 5A:
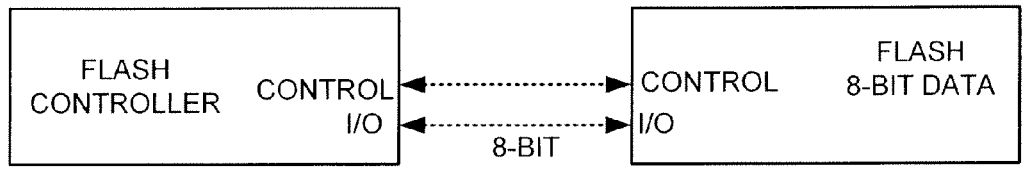
FIG. 5A is a block diagram illustrating an 8-bit access with 8-bit data flash memory.
Figure 5B:
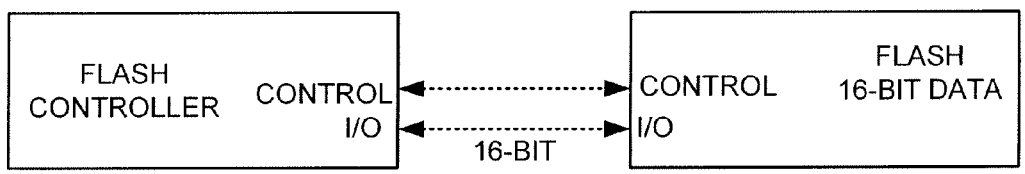
FIG. 5B is a block diagram illustrating a 16-bit access with 16-bit data flash memory.
Figure 5C:
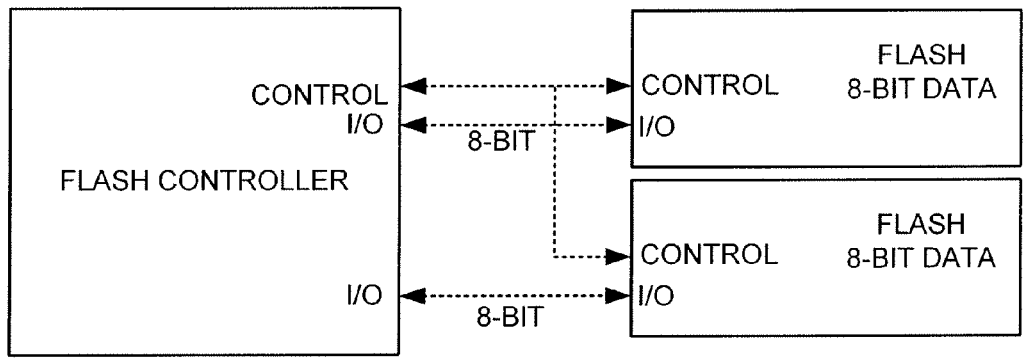
FIG. 5C is a block diagram illustrating a 16-bit dual channel access with two 8-bit data flash memories via a single control.

A typical electronic data flash card uses a flash memory with single-channel (8-bit) data bus, as shown in FIG. 5A. With multiple-channel data bus, more data bits can be read from or write to the flash memories simultaneously, thereby the access speed is enhanced. For example, dual-channel (16-bit) data bus can double the access speed to the flash memory, quad-channel (32-bit) data can increase the access speed by 4 times, and so on. Electronic data flash card with dual-channel data width can be realized by one 16-bit wide flash memory as illustrated in FIG. 5B, by two 8-bit wide flash memories via a single control as illustrated in FIG. 5C, or by two 8-bit wide flash memories via separate controls as illustrated in FIG. 5D.

Figure 5D:
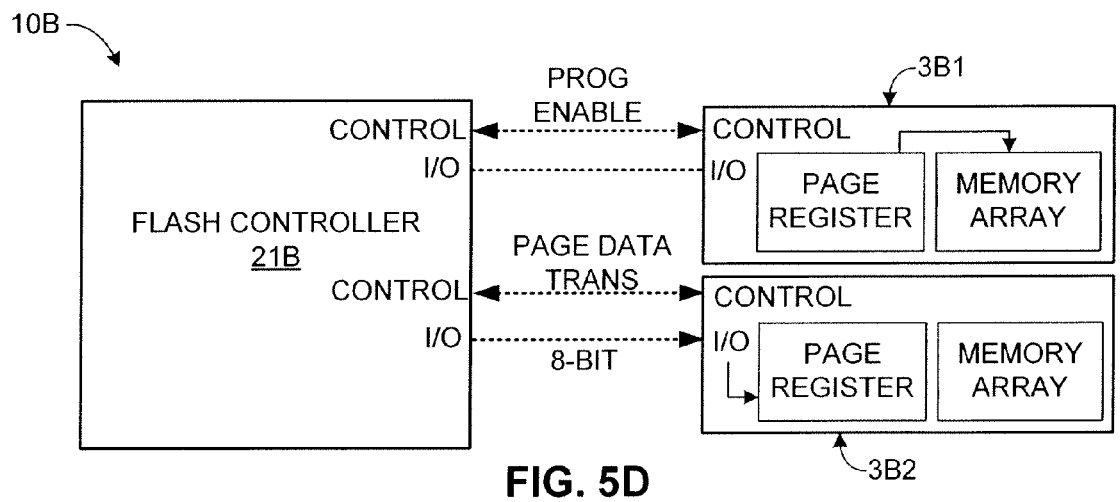
FIG. 5D is a block diagram illustrating a 16-bit interleave channel access with two 8-bit data flash memories via separate controls according to an embodiment of the present invention.

Electronic data flash card 10B, which is depicted in FIG. 5D, includes separate control and I/O connections for each flash memory device 3B1 and 3B2, thereby enabling interleaved programming that enhances system speed and avoids peak power consumption. Flash memory devices consume higher power in the programming (writing) mode, in which data is transferred from page register into the flash cells of the memory array, than in any other operating mode (e.g., reading data from the flash cells, or writing memory to the page register from an external source). In accordance with the present invention, interleaved programming of flash memory devices 3B1 and 3B2 involves "write staggering", wherein flash memory controller 21B enables one flash memory device (e.g., flash memory device 3B1) to program (write) data from its page register into its flash memory array while the other flash memory devices (e.g., flash memory device 3B2) are limited to non-programming operations (e.g., enabled to receive data from flash memory controller 21B to the page register (i.e., no writing is performed in flash memory device 3B2 while a write operation is being performed by flash memory device 3B1). This avoids operating multiple flash memories in programming mode at the same time, and increases the speed of flash memory access by allowing the throughput for access to each flash memory device 3B1 and 3B2 to match the speed of the host computer interface standard. In addition to enhancing access speed, this interleave access approach allows the system to avoid peak power consumption that can be caused by writing multiple flash devices at the same time.

Figure 6:
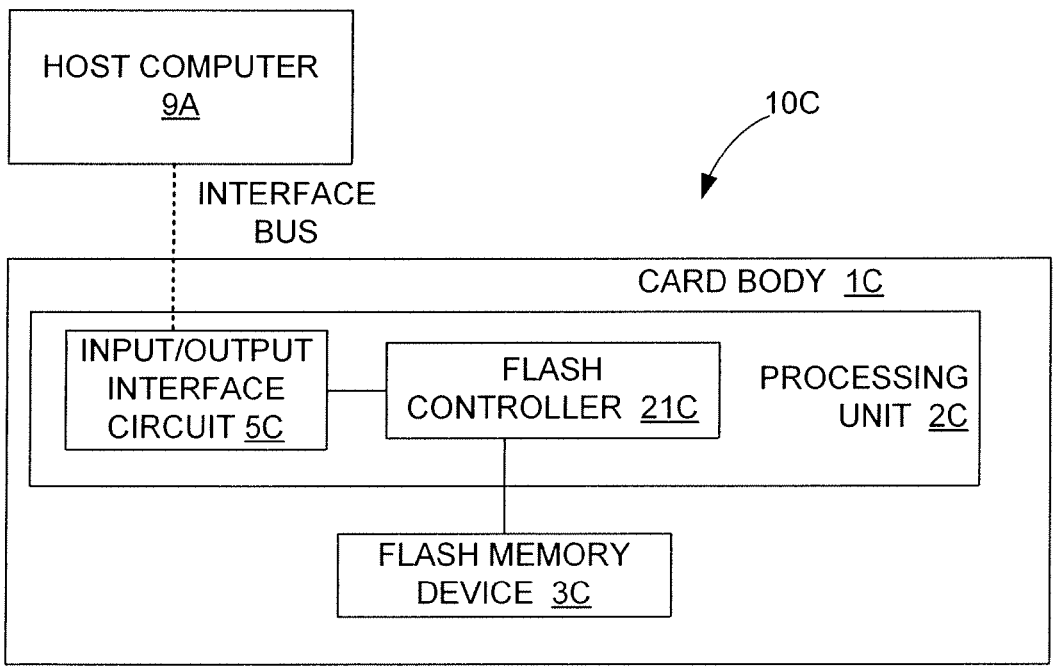
FIG. 6 is a schematic circuit block diagram illustrating an electronic data flash card according to another embodiment of the present invention.

The various novel aspects described above may be implemented together or independently while remaining within the spirit and scope of the present invention. For example, FIG. 6 shows an electronic data flash card (or electronic data storage medium, or integrated circuit card) 10C according to yet another embodiment of the present invention. Electronic data flash card 10C is adapted to be accessed by a host computer 9A via an interface bus or card reader (i.e., communication link), and includes a card body 1C, a processing unit 2C including a flash memory controller 21C and an input/output interface circuit 5C, and one or more flash memory devices 3C in according to one or more of the embodiments described above. Electronic data flash card 10C could be the functional subsystem for electronic data flash card 10A (described above), and also could be a functional subsystem for other applications.

Flash memory device 3C is controlled through commands generated by flash memory controller 21C, and stores a data file in the flash memory device.

Processing unit 2C is connected to flash memory device, said input/output interface circuit. Flash memory controller 21C inside processing unit 2C controls flash memory device 3C utilizing one or more of the methods described above. In one embodiment, flash memory controller 21C executes a flash type algorithm that determines if flash memory device 3C is supported by the static portion of the flash memory controller logic stored in ROM (not shown), and reads a dynamic portion of flash memory controller logic stored in flash memory device 3C if the flash type is "new".

According to another aspect, input/output interface circuit 5C is activated so as to establish USB Bulk Only Transport (BOT) communications with host computer 9A via the interface link. There are four types of USB software communication data flow between a host computer and the USB interface circuit of the flash memory device (also referred to as a "USB device" below): control, interrupt, bulk, and isochronous. Control transfer is the data flow over the control pipe from the host computer to the USB device to provide configuration and control information to a USB device. Interrupt transfers are small-data, non-periodic, guaranteed-latency, device-initiated communication typically used to notify the host computer of service needed by the USB device. Movement of large blocks of data across the USB interface circuit that is not time critical relies on Bulk transfers. Isochronous transfers are used when working with isochronous data. Isochronous transfers provide periodic, continuous communication between the host computer and the USB device. There are two data transfer protocols generally supported by USB interface circuits: Control/Bulk/Interrupt (CBI) protocol and Bulk-Only Transfer (BOT) protocol. The mass storage class CBI transport specification is approved for use with full-speed floppy disk drives, but is not used in high-speed capable devices, or in devices other than floppy disk drives (according to USB specifications). In accordance with an embodiment of the present invention, a USB flash device transfers high-speed data between computers using only the Bulk-Only Transfer (BOT) protocol. BOT is a more efficient and faster transfer protocol than CBI protocol because BOT transport of command, data, status rely on Bulk endpoints in addition to default Control endpoints.

As with previous embodiments described above, processing unit 2C is selectively operable in a programming mode, where processing unit 2C causes input/output interface circuit 5C to receive the data file from host computer 9A, and to store the data file in flash memory device 3C through write commands issued from host computer 9A to flash memory controller 21C, a data retrieving mode, where processing unit 2C receives the data in flash memory device 3C through read command issued from host computer 9A to flash memory controller 21C and to access the data file stored in flash memory device 3C, and activates input/output interface circuit 5C to transmit the data file to host computer 9A, and a data resetting mode where the data file is erased from flash memory device 3C.

Advantages of the intelligent processing unit 2C in accordance with the present invention include:
(1) providing high integration, which substantially reduces the overall space needed and reduces the complexity and the cost of manufacturing.
(2) utilizing an intelligent algorithm to detect and access the different flash types, which broadens the sourcing and the supply of flash memory;
(3) by storing the portion of software program along with data in flash memory which results in the cost of the controller being reduced; and
(4) utilizing more advanced flash control logic which is implemented to raise the throughput for the flash memory access.

In accordance with another embodiment of the present invention, a system and method is provided for controlling flash memory in an electronic data flash card. The system and method provide a flash memory controller including a processor for receiving at least one request from a host system, and an index, which comprises look-up tables (LUTs) and a physical usage table (PUT). The index translates logical block addresses (LBAs) provided by the host system to physical block addresses (PBAs) in the flash memory. The index also contains information regarding the flash memory configuration. The processor selectively utilizes the index to determine the sectors of the flash memory that are available for programming, reprogramming, or reading. The flash memory controller further comprises a recycling first-in-first-out (FIFO) that recycles blocks of obsolete sectors so that they are available for reprogramming. The recycling operation involves copy and erase operations, and is performed in the background and thus hidden from the host system. Accordingly, the management of the flash memory and related intelligence resides in the flash memory controller instead of in the host system. As a result, the host system interacts with the flash memory controller without the host system having information regarding the physical configuration of the flash memory. Consequently, speeds at which data is written to and read from the flash memory is significantly increased while the flash memory remains compatible with the USB standard and ASIC architecture.

The following terms are defined as indicated in accordance with the present invention. Block: A basic memory erase unit. Each block contains numerous sectors, e.g., 16, 32, 64, etc. If any sector encounters write error, the whole block is declared a bad block and all valid sectors within the block are relocated to another block. Sector: A sub-unit of a block. Each sector typically has two fields—a data field and a spare field. Obsolete sector: A sector that is programmed with data but the data has been subsequently updated. When the data is updated, the obsolete data remains in the obsolete sector and the updated data is written to new sectors, which become valid sectors. Non-valid blocks: Blocks that contain obsolete sectors. Valid sector: A sector that has been programmed with data and the data is current, i.e., not obsolete. Wear leveling: A method for evenly distributing the number times each block of flash memory is erased in order to prolong the life of the flash memory. Flash memory can be block erased only a limited number of times. For example, one million is a typical maximum number of erases for NAND flash memory. Spare blocks: Reserved space in flash memory. Spare blocks enable flash memory systems to prepare for bad blocks. Cluster: Multiple data sectors used as file access pointers by an operating system to improve memory performance. In small mass-storage memory operation, a cluster normally is a combination of two data sectors, which is a minimum file size unit. 1 k byte is a typical cluster size for small blocks of memory (i.e., 512 bytes per sector), and 4 k bytes is a cluster size for larger blocks of memory (i.e., 2,112 bytes per sector). FAT: File allocation table having file address-linked pointers. A cluster is the unit for a FAT. For example, FAT16 means that a cluster address can be 16 bits. Directory and subdirectory: File pointers as defined by an operating system. Master boot record (MBR): A fixed location to store a root directory pointer and associated boot file if bootable. This fixed location can be the last sector of the first block, or the last sector of the second block if first block is bad. Packet: A variable length format for a USB basic transaction unit. A normal transaction in the USB specification typically consists of three packets—a token packet, a data packet, and a handshake packet. A token packet has IN, OUT, and SETUP formats. A data packet size can be varying in size, e.g., 64 bytes in USB revision 1.1, and 512 bytes in USB revision 2.0. A handshake packet has ACK or NAK formats to inform host of the completion of a transaction. Frame: A bulk transaction that is used that has a high priority for occupying a frame if USB traffic is low. A bulk transaction can also wait for a later frame if USB traffic is high. Endpoint: Three endpoints include control, bulk-in, and bulk-out. The control endpoint is dedicated to system initial enumeration. The bulk-in endpoint is dedicated to host system read data pipe. The bulk-out endpoint is dedicated to a host system write data pipe. Command block wrapper (CBW): A packet contains a command block and associated information, such as Data Transfer Length (512 bytes for example from byte 8-11). A CBW always starts at the packet boundary, and ends as short packet with exactly 31 bytes transferred. All CBW transfers shall be ordered with LSB (byte 0) first. Command Status Wrapper (CSW): A CSW starts at packet boundary. Reduced block command (RBC) SCSI protocol: a 10 byte command descriptor.

Figure 7:
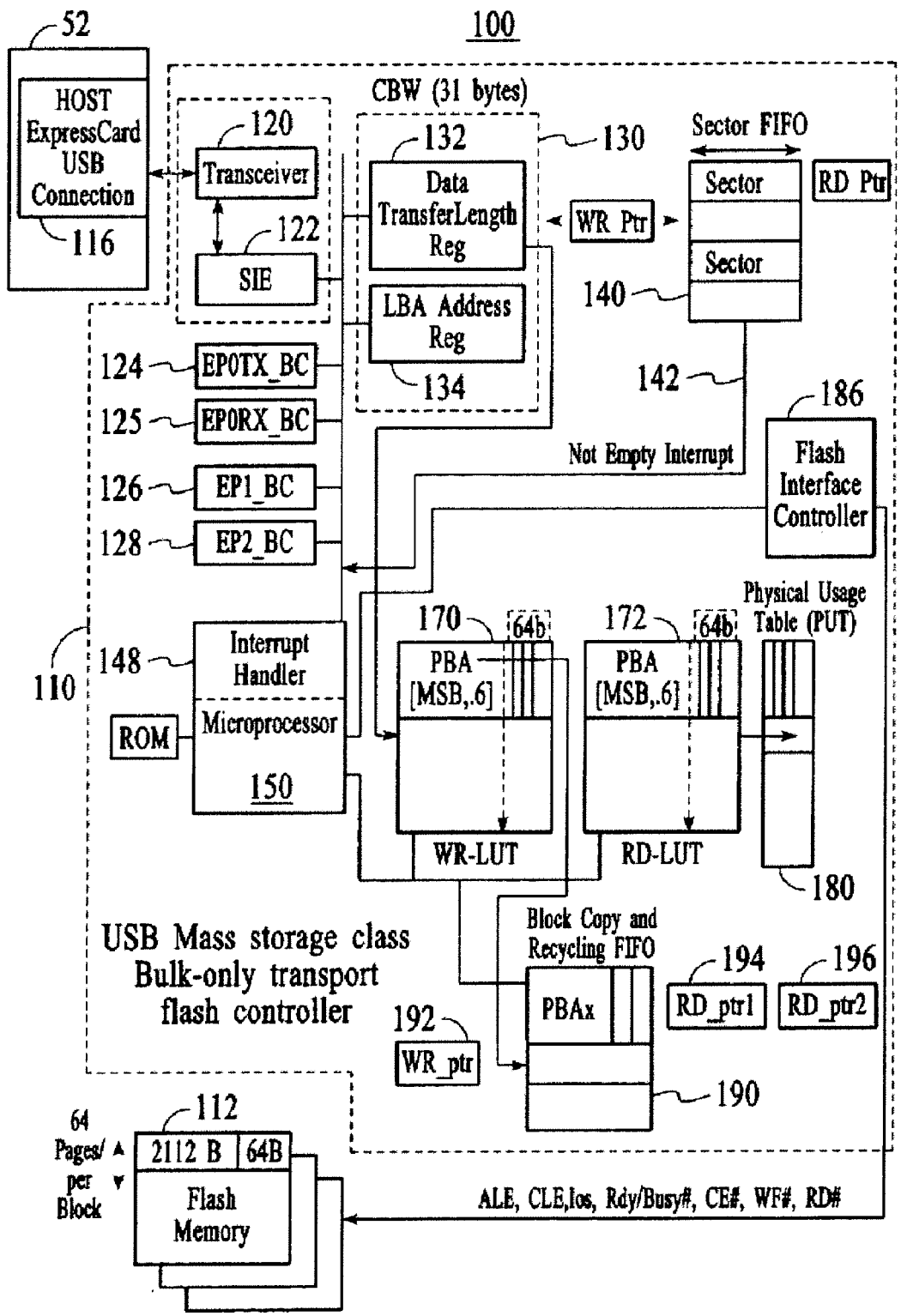
FIG. 7 is a block diagram of a flash memory system including a flash memory controller and a flash memory in accordance with the present invention.

FIG. 7 is a block diagram showing a electronic data flash card (memory system) 100 including a flash memory controller 110 and a flash memory device 112 in accordance with the present invention. The host system 52 provides resources to process write and read transactions, and erase operations via the flash memory controller 110. The flash memory controller 110 is coupled to a host system 52 via a host system interface 116. The host system 52 can be a personal computer or other type of computer system. The operating system of the host system 52 can be Windows or MacOS but is not limited to these operating systems. In this specific embodiment, the flash memory system 100 complies with the USB mass-storage class standard and the host system interface 116 is a USB connection. The USB specification can be revision 1.1 or 2.0 and above. The flash memory controller 110 and the flash memory 112 can be either bus-powered or self-powered, and can be used as a mass storage device. The advantage of being used as a mass storage device is that it is a low-power device, it is easy to carry, and it has storage capacity larger than a traditional floppy disk.

The flash memory controller 110 includes a device transceiver 120, which converts analog signals to digital streams and provides a phase lock loop (PLL) circuit for generating precision clocks for internal data latching. For USB 2.0, the PLL functionality can be sensitive and thus useful due to its operating at 480 MHz. The flash memory controller 110 also includes a serial interface engine (SIE) 122, which provides serial and parallel data conversion, packet decoding/generation, cyclic redundancy code (CRC) generation/checking, non-return-to-zero (NRZI) encoding/decoding, and bit stuffing according to the USB standard. Endpoints 124 and 125 receive information from the host system 52 regarding class type (e.g., mass-storage class), flash memory configuration information, and default control information. An Endpoint 126 receives information from the host system 52 regarding read transactions, and an endpoint 128 receives information from the host system 52 regarding write transactions. A bulk-only transport (BOT) unit 130 receives command block wrappers (CBW) and includes a data transfer length register 132 and a logical block address (LBA) register 134.

In accordance with an aspect of the present invention, the allocation of PBAs to LBAs is performed entirely by flash memory controller 110, thus allowing host system 52 to interact with flash memory device 110 (i.e., perform read, write and erase operations) without host system 52 having information regarding the actual physical location (configuration) of the data stored in flash memory device 112. That is, flash memory controller 110 utilizes arbitration logic and data that is entirely stored in electronic data flash card 100 (i.e., not received from host system 52) to identify bad blocks of memory cells in flash memory device 112, to assign LBAs to the PBAs associated with good blocks of memory cells, to recycle non-valid blocks, and to perform wear leveling. Because each of these operations is performed independent of host system 52, the operation of host system 52 is enhanced. Additional information regarding the arbitration logic utilized by flash memory controller 110 is provided in co-owned and co-pending U.S. patent application Ser. No. 11/471,000, entitled "MANAGING BAD BLOCKS IN FLASH MEMORY FOR ELECTRONIC DATA FLASH CARD", which is incorporated herein by reference in its entirety.

A sector FIFO 140 provides a caching feature when the host system 52 attempts to write data to the flash memory 112. A FIFO-not-empty interrupt signal 142 triggers an interrupt routine at an interrupt handler 148 of a processor 150. The interrupt routine responds to the host system 52 confirming that data was written to the flash memory 112. In the mean time, the processor 150 executes a write transaction.

A write look-up table (LUT) 170, a read LUT 172, and a physical usage table (PUT) 180 provide an index showing the configuration of the flash memory 112. The data stored in write and read LUTs 170 and 172 and PUT 180 is controlled by the arbitration logic (discussed above) utilized by flash memory controller 110. The write and read LUTs 170 and 172 facilitate write and read transactions, respectively, between the host system 52 and the flash memory 112. The write and read LUTs 170 and 172 translate logical block addresses (LBAs) provided by the host system 52 to physical block addresses (PBAs) of the flash memory 112. The PUT 180 performs physical sector mapping and provides a bitmap indicating programmed sectors, i.e., sectors to which data has already been written.

A flash interface controller 186 interfaces with the flash memory 112 to carry out commands from the processor 150. The flash interface controller 186 receives PBAs from the write and read LUTs 170 and 172 to service write and read requests.

A recycling FIFO 190 recycles blocks having obsolete sectors so that they can be reprogrammed, i.e., written to with new data. The recycling operations are executed immediately after and independently from write transactions so as to not interfere with the servicing of write transactions by the flash memory controller 110.

For optimal ASIC implementation, the write and read LUTs 170 and 172, the PUT 180, and the recycling FIFO 190 are implemented with volatile random access memory (RAM), such as synchronous RAM (SRAM). The flash memory 112 can be implemented using one or more devices, each having one or more flash arrays.

Figure 8:
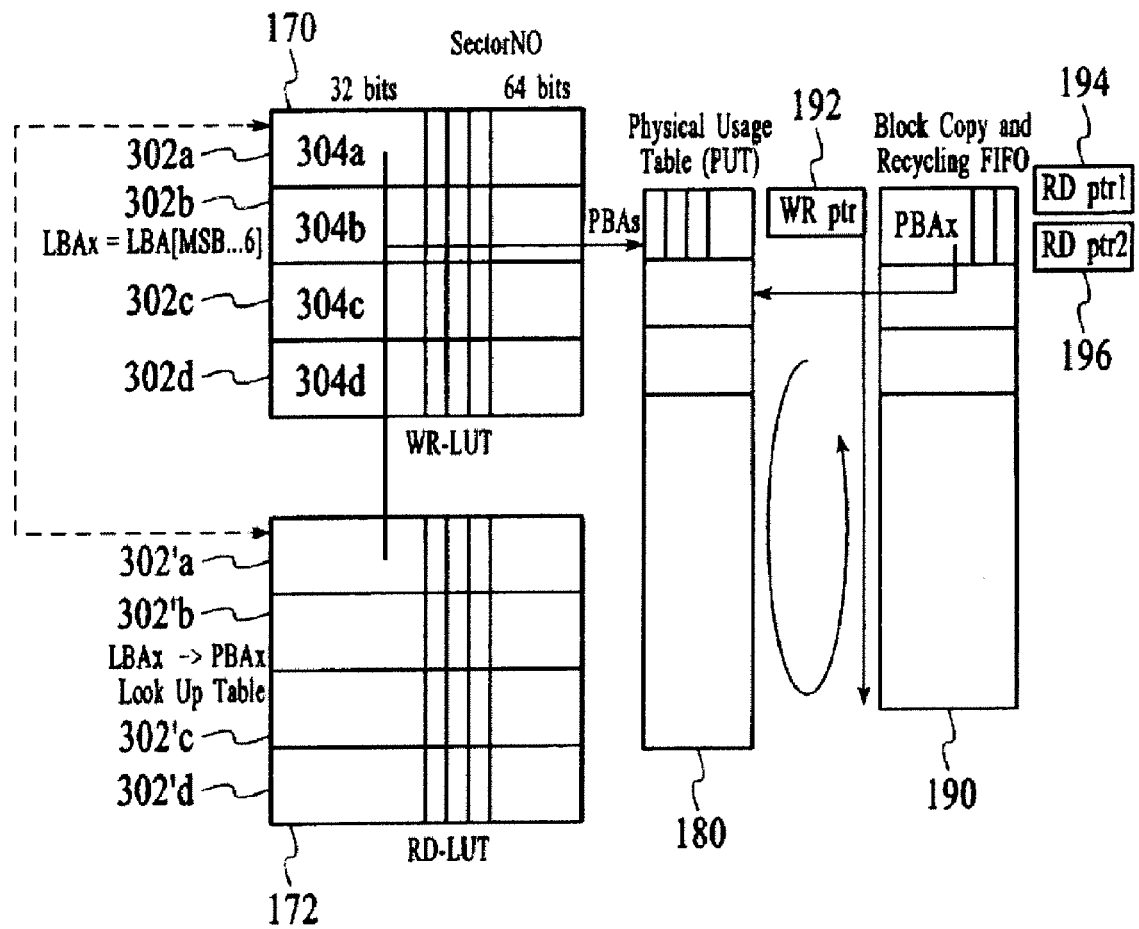
FIG. 8 is a block diagram showing in more detail the write look-up table, the read look-up table, the physical usage table, and the recycling first-in-first-out unit of FIG. 7 in accordance with the present invention.

FIG. 8 is a block diagram showing in more detail the write LUT 170, the read LUT 172, the PUT 180, and the recycling FIFO 190 of FIG. 7 in accordance with the present invention. The write LUT 170 provides an index for the flash memory during write transactions and translates LBAs provided by the host system to PBAs of the flash memory. The write LUT 170 contains LBAs 302a, 302b, 302c, and 302d. For ease of illustration, only four LBAs per LUT are shown. Each of the LBAs 302a-d includes optional block-offset bits (bit5 to bit0). The block-offset bits correspond to particular sectors in a block.

Each LBA 302a-d is associated with a PBA 304a-d. Accordingly, each LBAa-d points to an associated PBAa-d, respectively. In this specific example, a PBA is 32-bits long. A sector field 306 contains a string of bits indicating programmed sectors within a block.

The write LUT 170 records only the starting LBA for a particular write transaction. For example, if a particular write transaction requires two or more consecutive blocks, the write LUT 170 records the starting LBA.

The read LUT 172 provides an index for the flash memory during read transactions and translates LBAs provided by the host system to PBAs of the flash memory. The read LUT 172 contains LBAs 302'a, 302'b, 302'c, and 302'd. The read LUT 172 has the same fields as the write LUT 170. After the completion of each write transaction, the read LUT 172 is updated to reflect the changes to the write LUT 170 such that the write and read LUTs 170 and 172 become identical. Once the read LUT is updated, it can be used as an index for read transactions.

The PUT 180 performs physical sector mapping and provides a bitmap indicating programmed sectors, i.e., sectors to which data has already been written. Whenever a write transaction occurs, the PUT 180 records the usage information indicating the programmed sectors. This facilitates write transactions in that the processor of the flash memory controller can determine from the PUT 180 which sectors are available for programming or reprogramming.

The recycling FIFO 190 recycles non-valid blocks and the recycling process occurs after each successful write transaction. Whenever a block having an obsolete sector is encountered, information regarding that block's physical address is placed in the recycling FIFO 190 indicating it's a non-valid block. After finishing the valid sector copy-relocate operations, recycling FIFO 190 provides address information for performing non-valid block erase operations. The recycling FIFO 190 uses a write pointer 192 as updating FIFO address pointer for non-valid blocks and read pointers 194 and 196 as two read address reference pointers. Read pointer2 196 is used for background recycling reading reference and read pointer1 194 is a reference for valid block if the erase-recycling is successful. Read pointer1 194 should never exceed read pointer2 196. Both read pointers 194 and 196 should not overtake write pointer 192. In accordance with an aspect of the present embodiment, the copy-relocate (for remaining valid sectors within non-valid blocks) and erase-recycling operations are performed in the background, i.e., independently from write transactions so as to not interfere with the write transactions.

Figure 9:
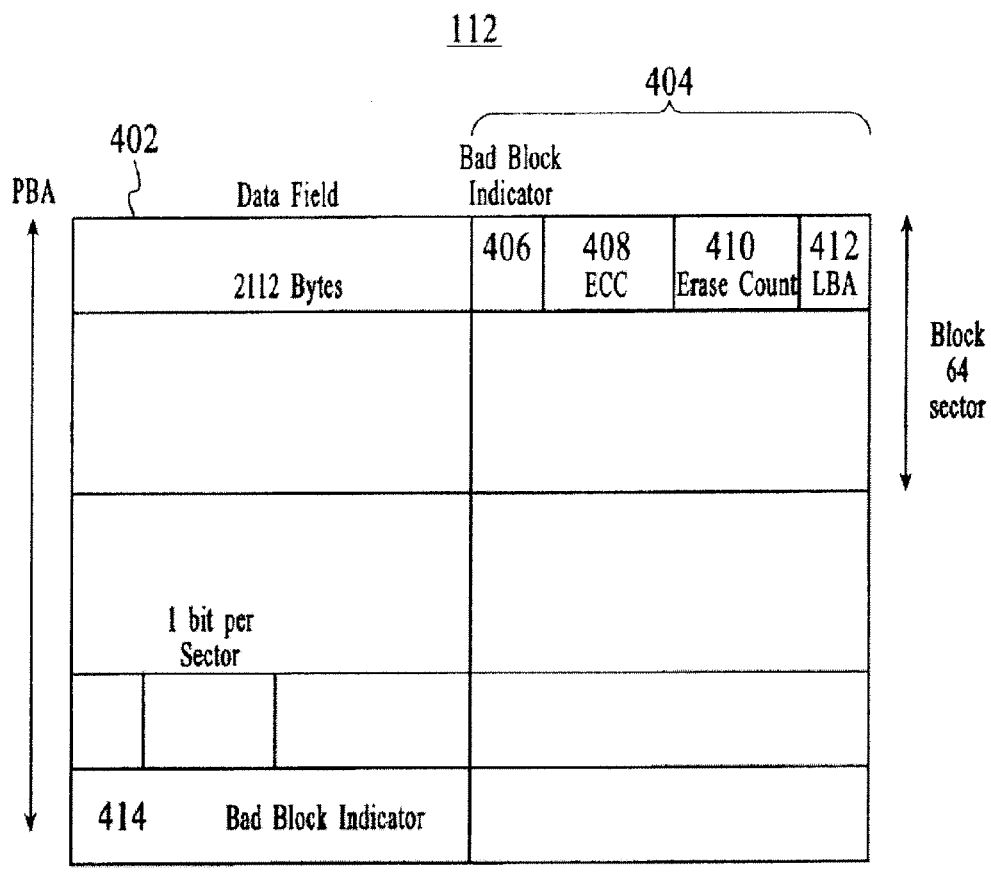
FIG. 9 is a block diagram showing in more detail the flash memory of FIG. 7 in accordance with the present invention.

FIG. 9 is a block diagram showing in more detail the flash memory 112 of FIG. 7 in accordance with the present invention. The flash memory 112 has a data structure that comprises a data field 402 and a spare field 404 for each PBA. Each field holds a certain number of bytes and the specific number will depend on the application. For example, a data field may have 512 bytes, 2,112, or more bytes, and the spare field can have 16, 64, or more bytes.

The data field 402 stores raw data and the spare field 404 stores information related to memory management. The spare field 404 includes a bad block indicator field 406, an error correction code (ECC) field 408, an erase count field 410, and an LBA field 412. Because the LUT and PUT tables 170, 172, and 180 are stored volatile memory and thus do not preserve the valid sector information, the LBA field 412 is used to reconstruct the write and read LUTs 170, 172 and the PUT 180 during system initialization and power failure.

The bad block indicator field 406 indicates bad blocks. A bad block occurs when an attempt to write to a particular sector or to erase a particular block fails. A special bad block indicator field 414 is located at the last block, a location, which is easier for the firmware to read, especially where there is one bit per sector. In this specific embodiment, 64 bits are used for a physical block to record the write sector failure (64 bits×4096 blocks=32 Kbytes=16 sectors=1 quarter block). Any 1s within a block means that the particular block is bad. To maintain reliability, four copies of bad block indicators are saved in the last block of the flash memory. Of course fewer or more copies can be utilized.

The need for flags in the flash memory is eliminated by the present invention. The only flag used is the valid sector flag used in the LUTs to assist in firmware decision making. This minimizes the complexity with regard to write and read transactions.

Figure 10:
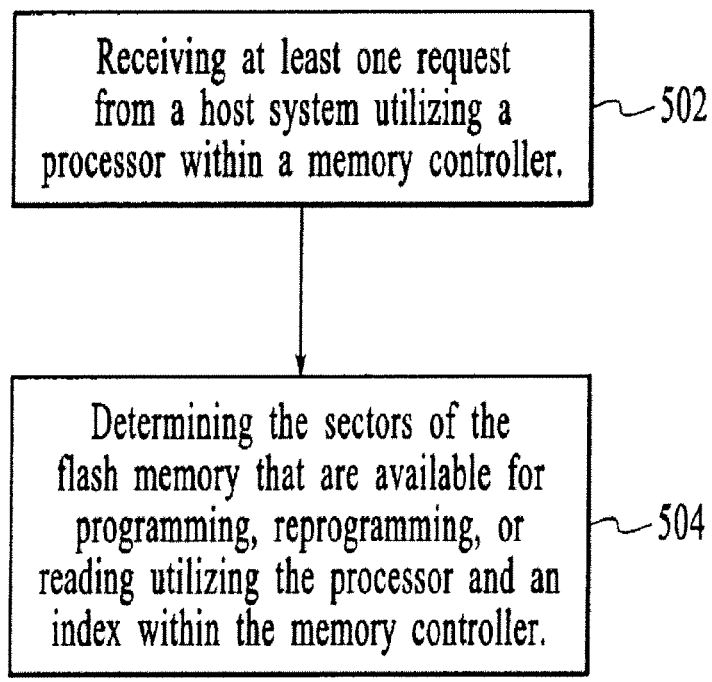
FIG. 10 is a high-level flow chart showing a method for managing flash memory in accordance with the present invention.

FIG. 10 is a high-level flow chart showing a method for managing flash memory in accordance with the present invention. First, at least one request from a host system is received utilizing a processor within a memory controller, in a step 502. The request can be a write or read request. Then, the sectors of the flash memory that are available for programming, reprogramming, or reading are determined utilizing the processor and an index within the memory controller, in a step 504. The host system interacts with the flash memory controller without the host system having information regarding the configuration of the flash memory.

In a specific embodiment, the flash memory controller receives a request from the host system in compliance with the USB mass-storage class. The following description illustrates this specific embodiment.

Figure 11:
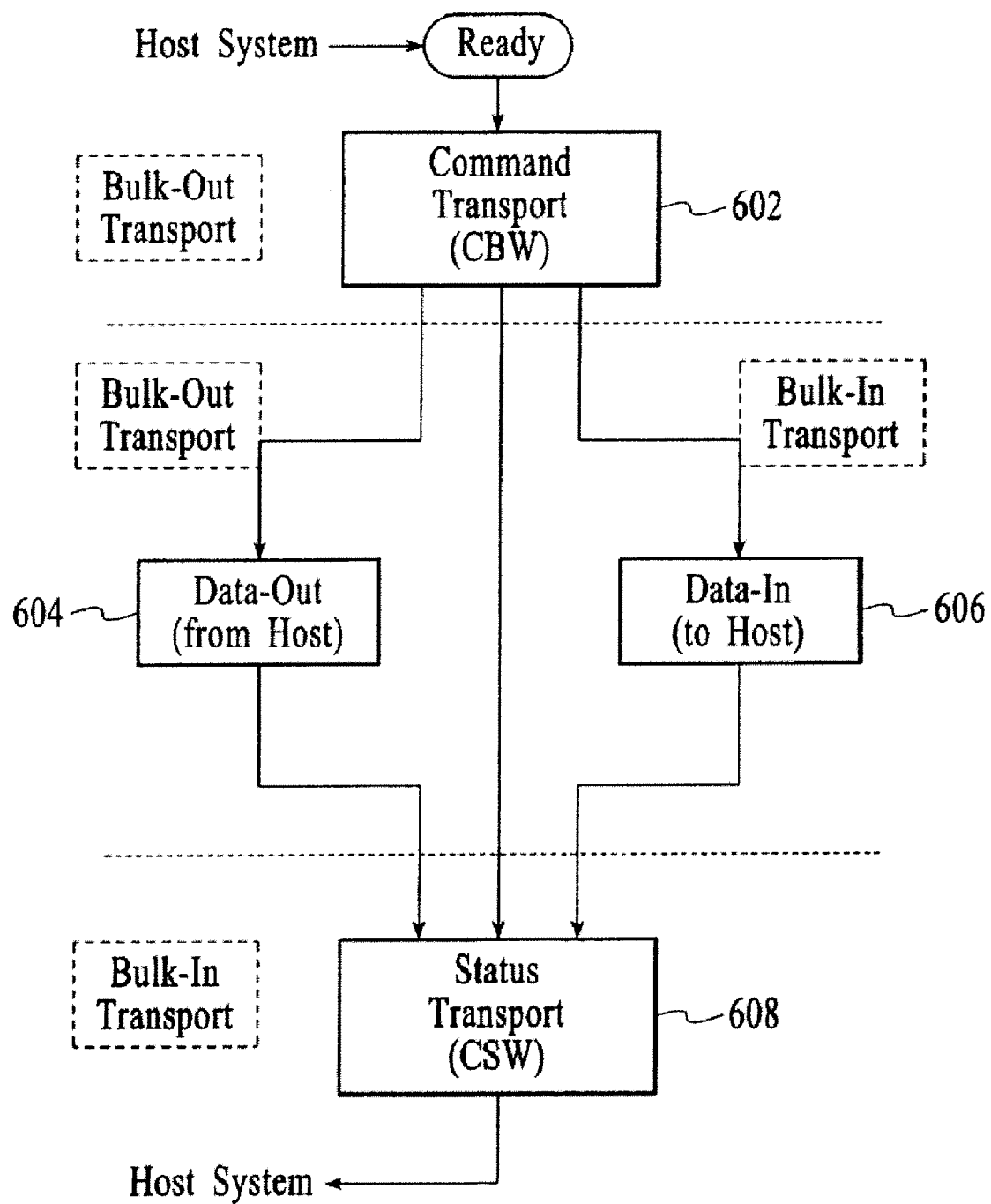
FIG. 11 is a flow chart showing a method for transmitting USB mass-storage class service requests in accordance with the present invention.

FIG. 11 is a flow chart showing a method for transmitting USB mass-storage class service requests in accordance with the present invention. First, the memory controller receives a request from the host system, in a step 602. This step can be referred to as a command transport step 602. The request can be a write or read request. If the request is a write request, a write transaction is performed, in a step 604. This step can be referred to as a data-out step 604. If the request is a read request, a read transaction is performed, in a step 606. This step can be referred to as a data-in step 606. Upon completion of a write or read transaction, an acknowledge packet is sent to the host system by the memory controller to confirm completion of the transaction, in a step 608. This step can be referred to as a status transport step 608.

The command transport step 602 and the data-out step 604 are generally referred to as bulk-out transport steps since data packets are sent out from the host system. The data-in step 606 and the status transport step 608 are generally referred to as bulk-in transport steps since data packets are sent into the host system.

FIGS. 12A-C are block diagrams showing a command block wrapper (CBW) 702, a reduced block command read format (RBC) 704, and a command status wrapper (CSW) 706 in accordance with the present invention. The USB standard involves three packets per request, which include the CBW 702, the RBC 704, and the CSW 706. The CBW 702, the RBC 704, and the CSW 706 packets are also generally referred to as token, data, and acknowledge handshake packets, respectively, and are utilized in the command transport, data-in/out, and status transport steps 602-608 of FIG. 11, respectively.

Still referring to FIGS. 12A-C, the CBW 702 contains information regarding what data from the host system is to follow. The CBW 702 is 31 bytes long and includes command decoding and direction, and a unique LBA. The LBA in the CBW 702 can include information regarding the file allocation table (FAT) and directory pointers. The CBW 702 also contains the read/write direction in byte 15 as part of the RBC command. The RBC 704 contains information such as data to be written to the flash memory. The RBC 704 is a SCSI RBC. The length of the data can vary and is defined by different USB standard versions, e.g., 64 bytes in USB 1.1, 512 bytes in USB 2.0. The CSW 706 contains information regarding acknowledge procedures and information for terminating a transaction. Byte 12 is a status byte.

Figure 13:
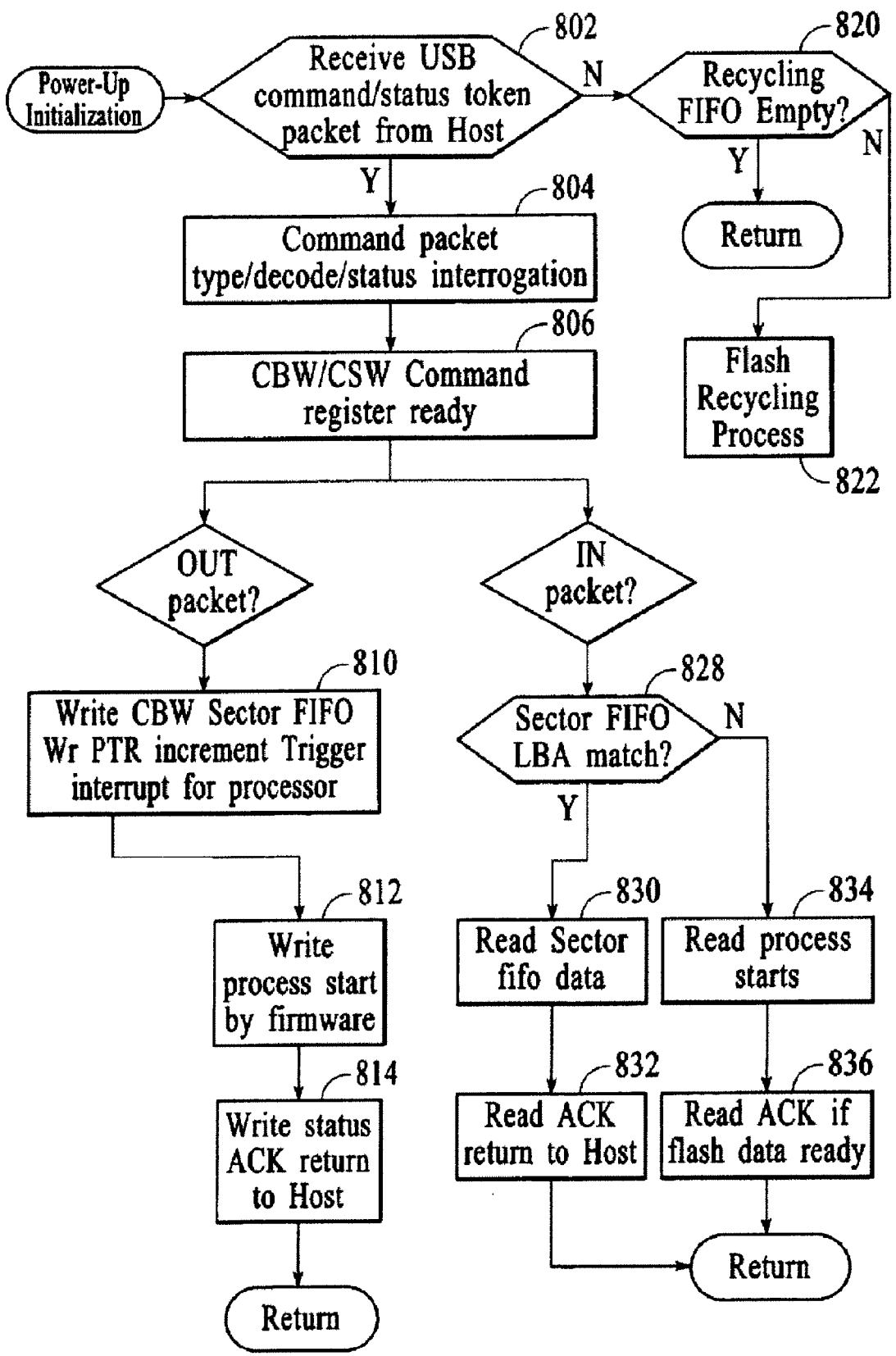
FIG. 13 is a flow chart showing a method for reading, writing, and erasing in accordance with the present invention.

FIG. 13 is a flow chart showing a method for reading, writing, and erasing in accordance with the present invention. Referring to FIGS. 12A-C and 13 together, first, a request is received from the host system, in a step 802. To comply with the USB standard, the request includes the CBW 702, the RBC 704, and the CSW 706. Next, the type of command, whether a write or read request, is determined, in a step 804. Next, registers for the CBW and CSW are initialized, in a step 806.

If the request is a write request for a write transaction, the sector data FIFO in the flash memory controller is filled, and when 512 bytes of data are ready, a write pointer for the sector data FIFO is incremented and an interrupt is sent to the processor in the flash memory controller, in a step 810. Next, the write transaction is executed, in a step 812. Finally, an acknowledge packet is sent to the host system confirming that the write transaction was successfully completed, in a step 814.

Immediately after a successful write transaction, the firmware of the flash memory controller checks the recycling FIFO status, in a step 820. If the recycling FIFO is not empty, the recycling FIFO recycles obsolete sectors, in a step 822.

If the request is a read request for a read transaction, the LBA in the CBW is compared with all existing entries of the sector FIFO, in a step 828. If there is a match, the requested data is returned to the host system, in a step 830. Next, an acknowledge packet is sent to the host system confirming that the read transaction was successfully completed, in a step 832. If there is no match, the requested data is read from the flash memory, in a step 834. Finally, a status/acknowledge packet is sent to the host system confirming that the read transaction was successfully completed, in a step 836.

Figure 14:
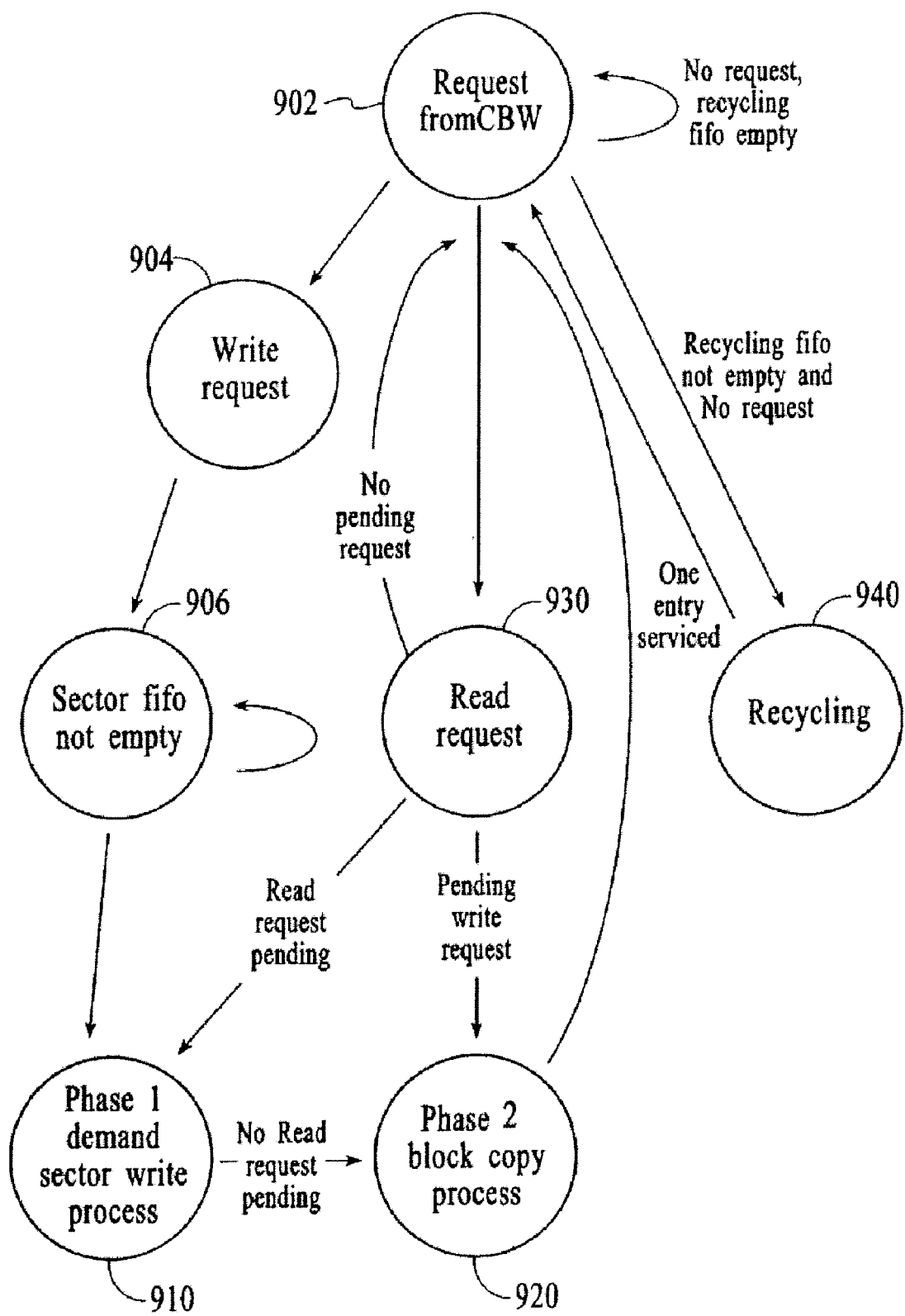
FIG. 14 is a high-level flow chart showing a method including a first phase of a write transaction, a second phase of the write transaction, a read transaction, and a recycling operation in accordance with the present invention.

FIG. 14 is a high-level flow chart showing a method including a first phase of a write transaction, a second phase of the write transaction, a read transaction, and a recycling operation in accordance with the present invention. First, a CBW is received, in a step 902. Next, it is determined whether the request is a write request, in a step 904. Next, if the request is a write request, the sector FIFO is checked, in a step 906. If the sector FIFO is not empty, the write transaction is then initiated.

To maintain block address consistency and to achieve write efficiency, the write transaction has two phases. In the first phase, data is written to a particular number of sectors and an acknowledge packet is then sent to the processor of the flash memory controller and to the host system indicating that the write transaction has been completed, in a step 910.

If there is no subsequent read request pending, the second phase of the write transaction is initiated. Accordingly, valid sectors are copied from a non-valid block to a new address in another block, in a step 920. The copy step 920 is accomplished in the background to maintain data coherency.

If it is determined that the request is a read request and if there is a read request pending upon the completion of the first phase of the write transaction, the requested data is fetched from the flash memory using the PBA in the read LUT, in a step 930. After the read request is serviced, and if there is a pending second phase of a write request, the second phase is executed, in the step 920.

Obsolete sectors are recycled by the recycling FIFO, in a step 940, when there are no requests being serviced. In a specific embodiment, when the recycling FIFO completes the task of erasing one block, the firmware of the flash memory controller can return to servicing other requests from the host system.

Figure 15:
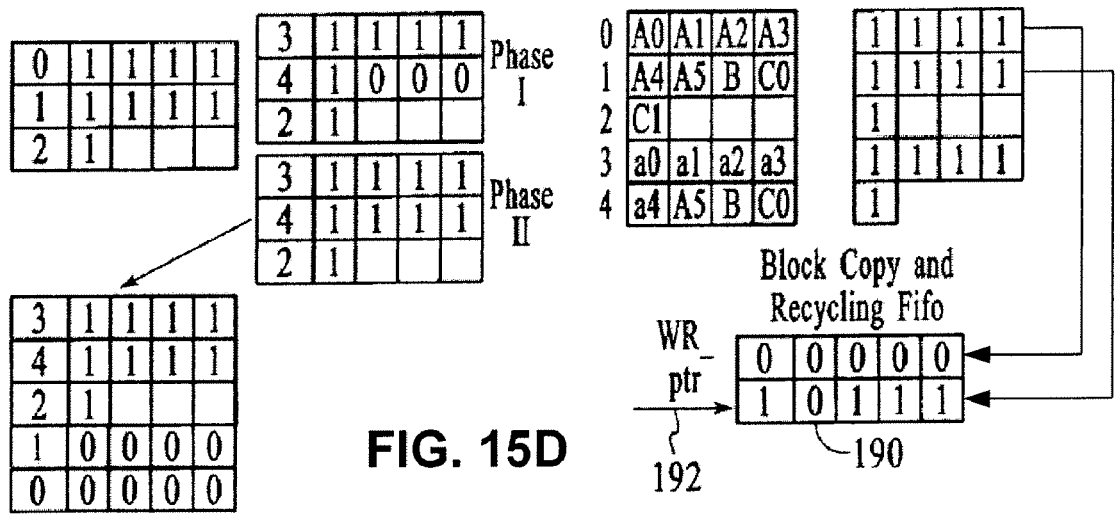
FIGS. 15A, 15B, 15C and 15D are block diagrams illustrating exemplary results from first and second phases of a write transaction in accordance with the present invention.

FIGS. 15A-D are block diagrams illustrating exemplary results from first and second phases of a write transaction in accordance with the present invention. To further clarify the above-described features of the present invention, the following example is provided. FIGS. 15A-D show four write transactions including varying-length data strings. FIG. 15D shows a write transaction where data is updated. For ease of illustration, only four sectors per block are shown.

Two blocks (PBA 0 and PBA 1) of the flash memory 112 have four sectors each. In a first write transaction, the write LUT 170 writes to six physical sectors of the flash memory 112, beginning the first physical block (PBA 0). For this example, it is presumed that the flash memory 112 is initially empty. For the purpose of this example, the labels A0-A5 represent data written during the first write transaction.

Bits in the PUT 180 corresponding to the sectors of the flash memory 112 show a 1 to indicate that those sectors have been programmed, i.e., occupied. The firmware of the flash memory controller utilizes the PUT 180 to determine the available sectors. Accordingly, those sectors have data that cannot be reprogrammed until first erased but those sectors can be later read. The write LUT 170 having written to the sectors indicates the valid sectors with 1s. The read LUT 172 information is copied from the write LUT 170 information to reflect the most recent changes. However, the read LUT 172 is copied from the previous version of the write LUT 170 and is ultimately synchronous with the write LUT 170 once the write phases are completed. Accordingly, until the read LUT 172 is updated, it will show the pre-update information of the write LUT 170 with 0s shown to indicate empty sectors.

Referring to FIG. 15B, the write LUT 170 has written new data B in the next available sector in PBA 1. This is the second write transaction. The write LUT 170, the PUT 180, and flash memory block reflect this update. The read LUT 172 has been updated with the prior change but has not yet been updated to reflect the current change.

Referring to FIG. 15C, the write LUT 170 has written new data C0 and C1 to the next available sectors. This is the third write transaction. Note that the data C0 and C1 cross the block boundary as does the data A0-A5. Again, the write LUT 170, the PUT 180, and flash memory blocks reflect this update. The read LUT 172 has been updated with the prior change but has not yet been updated to reflect the current change.

Referring to FIG. 15D, the write LUT 170 has written data to update existing data A0-A4 with updated data a0-a4. This is the fourth transaction. Because the blocks PBA 0 and PBA 1 need to first be erased before being reprogrammed, the updated data a0-a4 are written to the same sector number but to the next available block, i.e., PBA 3-4, in the first phase of the write transaction. Once the first write phase is complete, acknowledge packets can then be sent to the processor of the flash memory controller confirming completion of the first phase of the write transaction. The write LUT 170, the PUT 180, and the flash memory blocks reflect this update, and the read LUT 172 has been updated with the prior change but has not yet been updated to reflect the current change.

The blocks PBA 0 and PBA 1 have become non-valid because the data in some of their sectors became obsolete. Accordingly, those blocks can then be recycled by the recycling FIFO 190. The recycling FIFO 190 has changed corresponding bits to 0 to indicate this. The write pointer 192 of the recycling FIFO 190 is incremented to point to the next available position to store the nextnon-valid block address.

In the second phase of this write transaction, the data A5, B, and C0 are copied to new blocks, which are blocks PBA 3-4 to maintain consistency in the write LUT 170. The write LUT 170, the PUT 180, and the flash memory blocks reflect this update. The read LUT 172 will then be updated to reflect the current change. Also both phases of the write transaction are complete, the write and read LUTs 170 and 172 will be identical.

Figure 16:
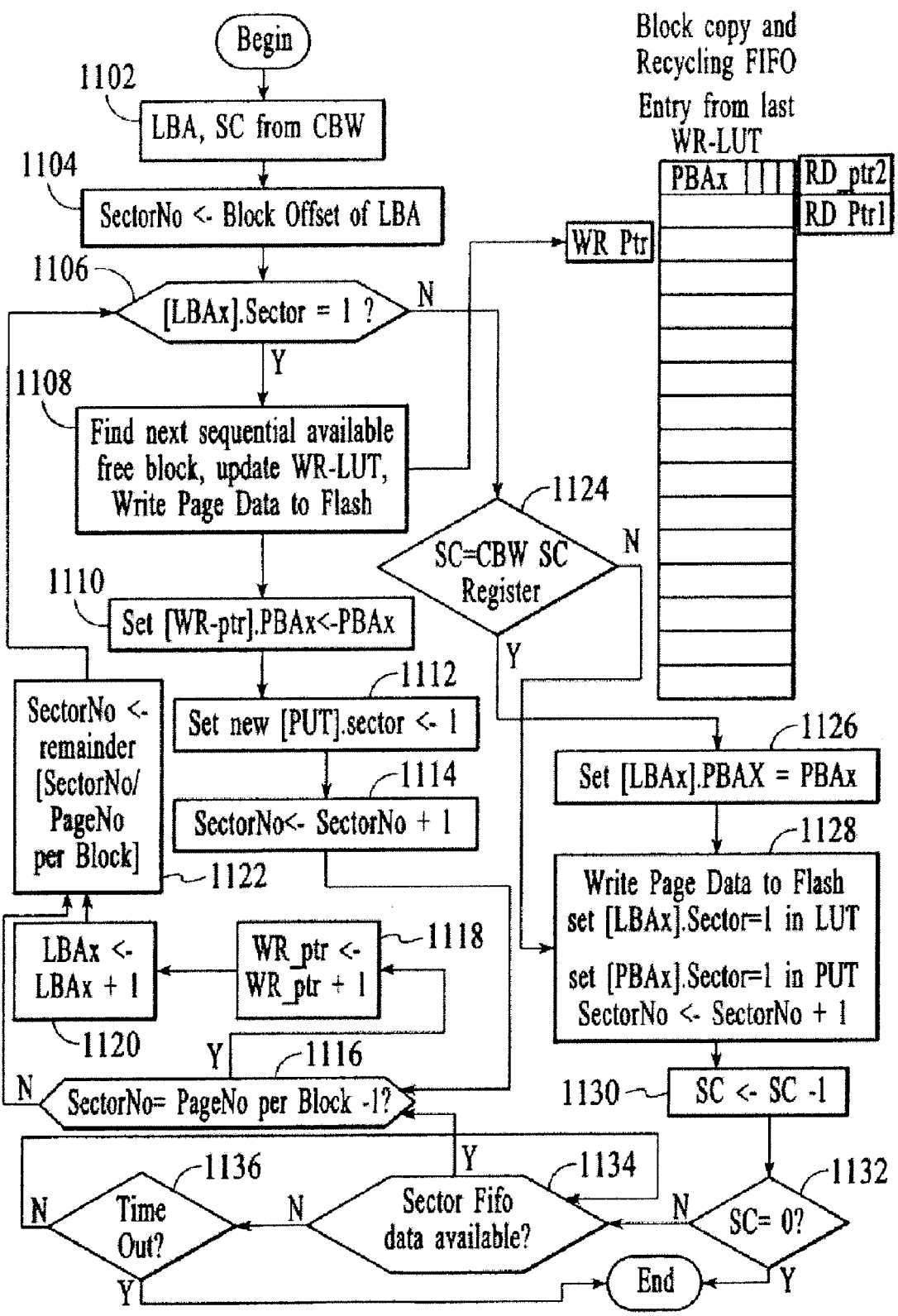
FIG. 16 is a flow chart showing a method for implementing the first phase of the write transaction of FIG. 14 in accordance with the present invention.

FIG. 16 is a flow chart showing a method for implementing the first phase of the write transaction of PBA and sector count updating procedure of FIG. 14 in accordance with the present invention, which basically does index mapping between LBAx and PBAx so that both read and write addresses are kept in tracking. Table 1 (below) is a simplified example of one entry of LUTs and FIFO with assumed 8 sectors per block in flash memory. An entry of 1 means sector data is valid, and 0 means sector is available for use. Please note that LUTs (mapping table) are pointed by LBAx, but FIFO is pointed by Wr_ptr and Rd_ptrs.

TABLE 1

| Sector field | PBA w/o sector offset | | | | | | | |
|---|---|---|---|---|---|---|---|---|
| | 0 | Sec 1 | Sec 2 | Sec 3 | Sec 4 | Sec 5 | Sec 6 | Sec 7 |
| PBAx | 1 | 0 | 0 | 1 | 1 | 0 | 0 | 0 |

Initially, an LBA and sector count (SC) from host system is evaluated, in a step 1102. Then, LBA block offset bits are encoded into a sector count, in a step 1104. The LBA points to a PBA in the flash memory. For example, if LBA is 0010,0101 and sector number is 16, then 0010 will be the initial LBAx block address for both LUT entry pointers. If the sector field of the PUT is 0, i.e., the sector is available, then the sector count register is equal to the CBW sector count and the PBA field of the write LUT will be loaded, in a step 1106.

If the sector field of the write LUT is 1, this means the flash sector is used by previous programming, and the write pointer is positioned to the block to be erased, in a step 1108. Next, the entry of recycling FIFO pointed to by write_pointer will be filled by current PBAx, in a step 1110. During the recycling operation, the block pointed to by the write pointer will be erased. Next, the sector field in the PUT is set to 1, in a step 1112, where the PBA indicates that the sector is being used. Next, the sector number in incremented, in a step 1114.

Next, the sector number is compared against the block boundary, in a step 1116. If the sector number is aligned with the block boundary, the write pointer is incremented, in a step 1118. The LBA in the write LUT is incremented, in a step 1120, when flash block boundary is reached. Next, the write LUT is updated with the correct sector number position, in a step 1122. If the sector number is not aligned with the block boundary, steps 1118 and 1120 are bypassed and the write LUT is updated with the correct sector number position, in a step 1122.

Referring back to the step 1106, if the sector field of write LUT is 0, which means that the flash sector is not used by previous programming, i.e., the write transaction is not finished. The sector count is then compared to the sector count in the CBW, in a step 1124. If they are the same, PBAx field of LUT pointed by LBAx will be updated in a step 1126, then proceed to step 1128. If the sector count register is not equal to the CBW sector count in step 1124, the sector field will be set to 1 in both index look up tables and data will be written into the flash memory. Next, the sector number is incremented, in a step 1128. After successful write into flash memory, sector count from CBW is decremented, in a step 1130.

Next, the sector count is checked, in a step 1132. If the sector count is equal to 0, the first phase of the write transaction terminates. If the sector count is not equal to 0, that means the host system did not send the correct amount of data. Accordingly, the sector FIFO is checked to determine whether there is any more available data, in a step 1134. If not, a time-out sequence is executed, in a step 1136, to flag an abnormal flow termination, and the sector FIFO is continually checked until sufficient data is available. If there is more available data in the sector FIFO, the sector number is compared against the block boundary, as in the step 1116.

Figure 17:
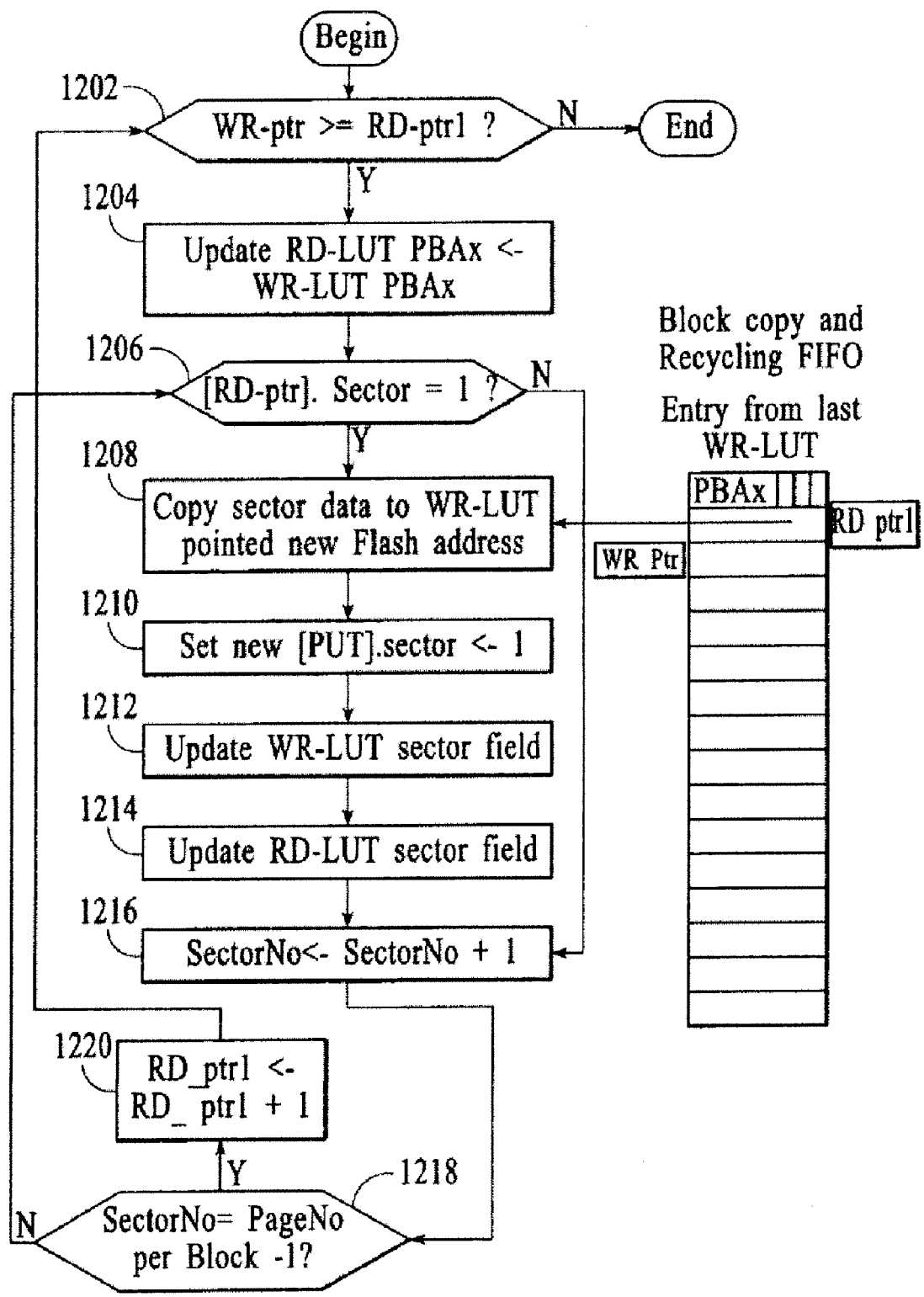
FIG. 17 is a flow chart showing a method for implementing the second phase of the write transaction of FIG. 14 in accordance with the present invention.

FIG. 17 is a flow chart showing a method for implementing the second phase of the write transaction of FIG. 14 in accordance with the present invention. First, the pointer values of the write and read pointers are compared, in a step 1202. The sector field from the recycling FIFO entry pointed to by the read pointer indicates that a valid sector needs to be copied to a new PBA in order to achieve consistency in the write LUT. When the copy is done, the read LUT is updated to be identical to the write LUT, in a step 1204. Next, the sector number pointed to by the read pointer is checked, in a step 1206. If the sector number is equal to 1, the data in that sector is copied to a new block, in a step 1208. Next, the sector number in the PUT is set to 1, in a step 1210. Next, the write LUT sector field is updated, in a step 1212. Next, the read LUT sector field is updated, in a step 1214. Next, the sector number is incremented, in a step 1216. Referring back to the step 1206, if the sector number is not equal to 1, the sector number is incremented, as in the step 1216.

The sector copying process will be completed as long as the sector number reaches the block boundary. The sector number is compared against the block boundary, in a step 1218. If the sector number is aligned with the block boundary, the read pointer is incremented, in a step 1220. Next, the read pointer is compared with the write pointer, as in the step 1202. If in the step 1218, the sector number is not aligned with the block boundary, the sector number pointed to by the read pointer is checked, as in the step 1206.

Figure 18:
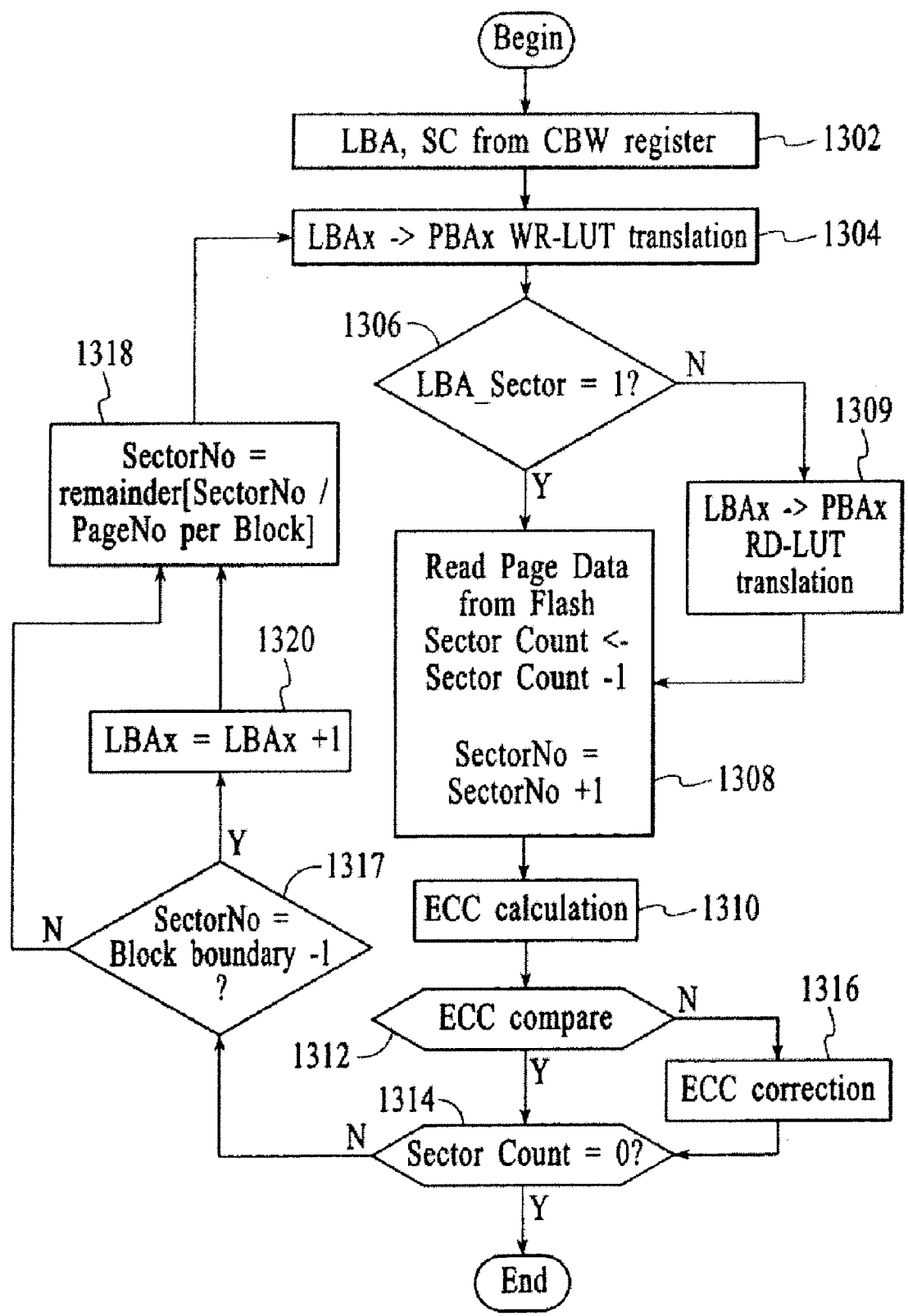
FIG. 18 is a flow chart showing a method for implementing the read transaction of FIG. 14 in accordance with the present invention.

FIG. 18 is a flow chart showing a method for implementing the read transaction of FIG. 14 in accordance with the present invention. First, a CBW is received and recognized as read request, and an LBA and sector count is loaded from the CBW, in a step 1302. Next, the LBA of the write LUT is translated into a corresponding PBA and sector number, in a step 1304. Next, the sector field bit is checked, in a step 1306. If the sector field bit is equal to 1, the data is read, the sector count is decremented, and the sector number is incremented in preparation for the next read transaction, in a step 1308. If the sector field bit is not equal to 1, i.e., equal to 0, the LBA of the read LUT is translated into a corresponding PBA, in a step 1309. Then the data is read, the sector count is decremented, and the sector number is incremented, as in the step 1308.

Next, an error correction code (ECC) calculation is performed, in a step 1310. Next, the ECC result is compared with a value read from the flash spare field, in a step 1312. If the values are identical, the sector count is checked, in a step 1314. If the values are not identical, an ECC correction is performed, in a step 1316, and then the sector count is checked, as in the step 1314. If the sector count has reached 0, i.e., equals 0, the read process terminates. If the sector count has not reached 0, the block boundary will also be checked, in a step 1317. If the sector number is not aligned with the block boundary, the read LUT is updated with the correct sector number position, in a step 1318. If the sector number is aligned with the block boundary, the LBA in the read LUT is incremented, in a step 1320, and then the read LUT is updated with the correct sector number position, as in the step 1318.

A read transaction is executed immediate after a first phase of a write transaction. The read transaction has a higher priority than the second phase of a previous write transaction. This ensures optimal responses by the flash memory system. A read transaction is significantly faster than a write transaction and read transactions do not result in bad block situations, which only occur during write transactions and erase operations.

A read transaction differs from a disk cache function whenever the contents in the sector FIFO are available. This can happen when the LBA in the read LUT matches the previous LBA in the write LUT. The disk cache concept is borrowed from magnetic hard disk concepts and applied to small-capacity flash storage. This feature is typically disabled to save cache cost.

Figure 19:
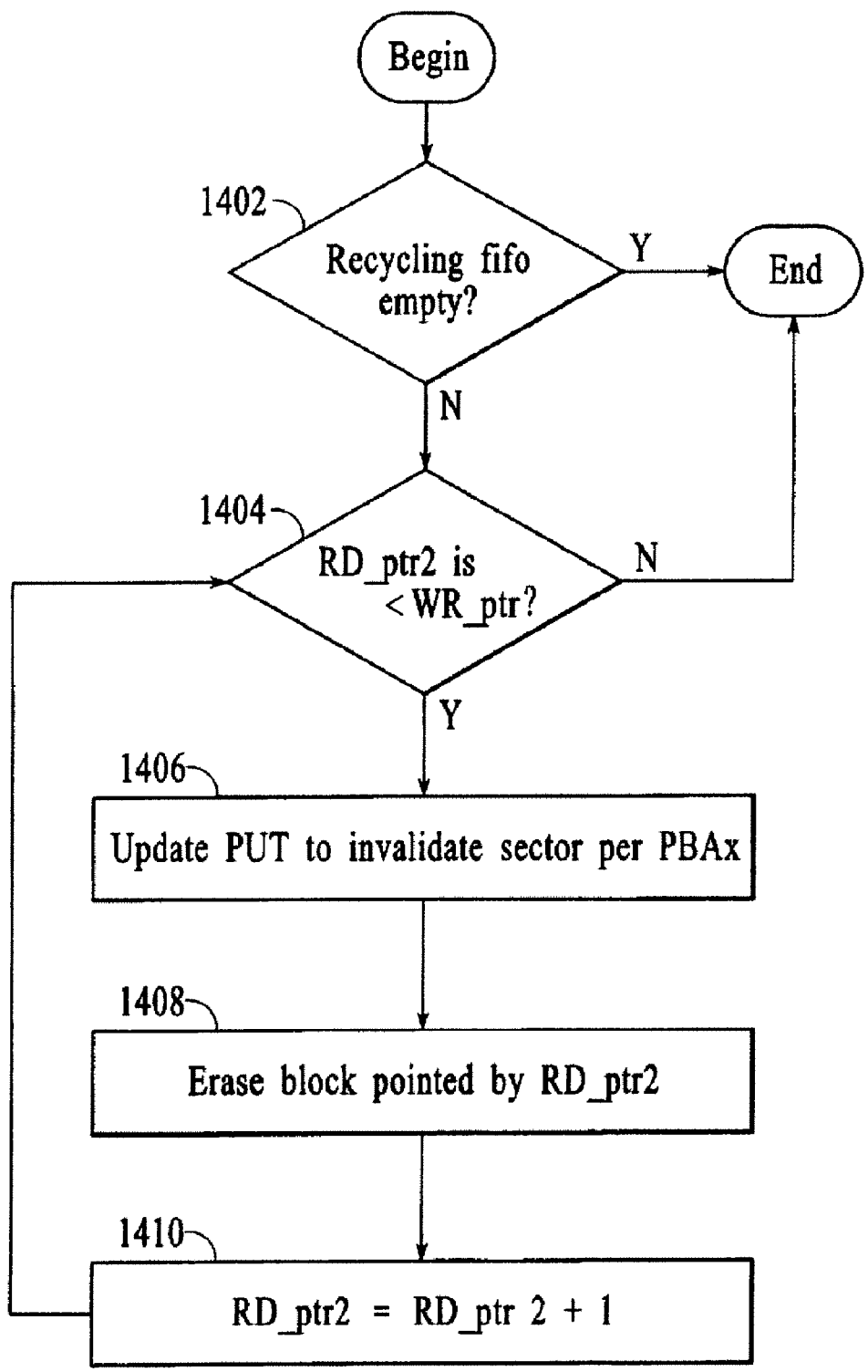
FIG. 19 is a flow chart showing a method for implementing the recycling operation of FIG. 14 in accordance with the present invention.

FIG. 19 is a flow chart showing a method for implementing the recycling operation of FIG. 14 in accordance with the present invention. First, the recycling FIFO is checked, in a step 1402. If the recycling FIFO is empty, the recycling operation terminates. If the recycling FIFO is not empty, the read pointer2 is checked, in a step 1404, background erasing operation happens in this case, once erasing is successful, read pointer1 is incremented for another valid block reprogramming address checking operation. The two read pointers should not overtake the write pointer. However, the write pointer may loop back to its original starting position if both read pointers are executed. If the read pointer2 is positioned over the write pointer, the recycling operation terminates. If the read pointer2 is not positioned over the write pointer, the corresponding bit in the PUT is cleared, i.e., 0, in a step 1406, to indicate that the physical block is now available for reprogramming. Next, the read pointer2 is positioned to point to the block to be erased, in a step 1408. Next, the read pointer2 is incremented after successful erasing, in a step 1410, for the next write address checking operation.

Pointer comparison for the recycling FIFO can be achieved by adding one more bit to the index of both the write and read pointers. For example, if the recycling FIFO contains eight PBA entries, four bits instead of three bits will be used for the pointers. The write pointer will start from 0 and increment to 7 and then cycle back to 0. The write pointer value should always be at least equal to or greater than the read pointers. When they are equal, it means that the recycling FIFO is empty. The depth, i.e., the number of entries, of the recycling FIFO affects the tradeoff between line-copy speed and the erase speed. Too few entries makes the recycling FIFO less optimal.

The flash memory controller of the present invention can perform multiple-block data access. The conventional flash memory device has a 512-byte page register built-in. The data write to the flash memory device has to write to the page register first and then to a flash memory cell. The conventional flash memory controller, as well as its built-in firmware, controls the flash memory access cycles. The conventional flash memory controller transfers one single block (512 bytes) of data to the page register of the flash memory device at a time. No other access to the flash memory is allowed once the 512 bytes page register is filled. Consequently, the conventional flash memory controller, which uses the single-block data access methodology, limits the performance of flash memory devices.

In accordance with the present invention, the flash memory controller utilizes a 2K or larger size page register. The flash memory controller of the present invention functions as a multiple-block access controller by sending multiple blocks of data simultaneously to a flash memory to fill up the page register. This significantly improves the performance of the data transfer. Compared to the conventional single-block data-transfer controller, which transfers a single block at a time, the data transfer performance using the flash memory controller of the present invention is significantly improved.

The flash memory controller of the present invention can also provide dual channel processing to improve performance of the flash memory system. Dual channeling provides a second channel, or "freeway," for executing transactions between the flash memory controller and the flash memory device. A conventional flash memory controller uses a single memory bus such that one or more flash memory devices attached to it. However, the conventional architecture limits the performance of the conventional flash memory controller.

In accordance with the present invention, at least two sets of memory buses are utilized. Each set of memory buses is coupled to separate flash memory devices. The memory controller can access flash memory devices together or separately. As a result, transactions can be executed twice as fast utilizing dual channel processing. Furthermore, each memory bus can also be further expanded to multiple sets of memory buses.

The flash memory controller of the present invention can also interleave operations. A conventional flash memory controller uses a single set of memory buses such that one or more flash memory devices are attached to it. However, the conventional flash memory controller can only access the flash memory devices one at a time. Accordingly, the conventional architecture limits the performance of the conventional flash memory controller.

In accordance with the present invention, at least one or two extra sets of memory control signals (such as separate Chip Enable and Busy signals) are utilized. Furthermore, a shared memory bus having at least two banks of flash memory devices are attached to the shared memory bus. The flash memory controller of the present invention can access one bank of flash memory devices while the other bank is busy reading or writing. Accordingly, the flash memory controller of the present invention fully utilizes the shared memory bus and thus significantly increase the performance. Furthermore, the number of pins of the flash memory controller are reduced by sharing memory I/O and control signals. This minimizes the cost to make flash memory devices.

In accordance with the present invention, one in the art can integrate functions of multiple block access, multiple bank interleaving, and multiple channel operations together in a memory access cycle of a single chip to achieve maximum performance.

In accordance with the present invention, the flash memory controller can be applied to USB as well as PCI-Express plug and receptacle systems. Also, the flash memory controller can be applied to other embodiments involving SD, MMC, MS, CF, IDE, and SATA plug and receptacle systems.

According to the system and method disclosed herein, the present invention provides numerous benefits. For example, it shifts the management of the flash memory and related intelligence from the host system to the flash memory controller so that the host system interacts with the flash memory controller without the host system having information regarding the configuration of the flash memory. For example, the flash memory controller provides LBA-to-PBA translation, obsolete sector recycling, and wear leveling. Furthermore, the recycling operations are performed in the background. Furthermore, flash specific packet definitions and flags in the flash memory are eliminated. Furthermore, the flash memory controller provides multiple-block data access, dual channel processing, and multiple bank interleaving. Consequently, speeds at which data is written to and read from the flash memory is significantly increased while the flash memory remains compatible with the USB standard and ASIC architecture.

A system and method in accordance with the present invention for controlling flash memory are disclosed. The system and method comprise a processor for receiving at least one request from a host system, and an index, which comprises look-up tables (LUTs) and a physical usage table (PUT). The index translates logical block addresses (LBAs) provided by the host system to physical block addresses (PBAs) in the flash memory. The index also contains intelligence regarding the flash memory configuration. The processor can utilize the index to determine the sectors of the flash memory that are available for programming, reprogramming, or reading. The flash memory controller further comprises a recycling first-in-first-out (FIFO) that recycles blocks having obsolete sectors so that they are available for reprogramming. The recycling operation involves copy and erase operations, and is performed in the background and thus hidden from the host system. Accordingly, the management of the flash memory and related intelligence resides in the flash memory controller instead of in the host system. As a result, the host system interacts with the flash memory controller without the host system having information regarding the configuration of the flash memory. Consequently, speeds at which data is written to and read from the flash memory is significantly increased while the flash memory remains compatible with the USB standard and ASIC architecture.

Although the present invention disclosed herein is described in the context of an electronic data flash card with or without fingerprint verification capability, the present invention may apply to other types of memory systems and still remain within the spirit and scope of the present invention. In addition, although the present invention disclosed herein is described in the context of the USB standard, the present invention may apply to other standards and still remain within the spirit and scope of the present invention. Further, embodiments of the present invention can be implemented using hardware, software, a computer readable medium containing program instructions, or combination thereof. Accordingly, many modifications may be made by one of ordinary skill in the art without departing from the spirit and scope of the appended claims.

We claim:

1. An electronic Multi Bit Cell (MBC) flash card adapted to be accessed by a host computer that is capable of establishing a communication link, said electronic MBC flash card comprising:
    a card body;
    a MBC flash memory device mounted on the card body, the MBC flash memory device including a plurality of non volatile memory cells for storing a data file, said memory cells being arranged in at least one of a plurality of memory blocks, a plurality of pages, and a plurality of sectors;
    an input/output interface circuit mounted on the card body for establishing communication with the host computer, wherein the input/output interface circuit includes a Universal Serial Bus (USB) interface circuit including means for transmitting said data file using a Bulk Only Transport (BOT) protocol; and
    a MBC flash memory controller mounted on the card body and electrically connected to said MBC flash memory device and said input/output interface circuit, wherein the MBC flash memory controller comprises:
    (a) means for determining whether the MBC flash memory device is supported by a processing unit of the MBC flash memory controller in accordance with a MBC flash detection algorithm code,
    (b) an index for storing a plurality of logical addresses and a plurality of physical addresses such that each said physical address is assigned to an associated said logical address, where each said physical address corresponds to an associated plurality of memory cells of the MBC flash memory device, and wherein the index comprises at least one look-up-table (LUT) for storing the logical addresses and the associated physical addresses,
    (c) means for selectively operating in one of:
        a programming mode in which said MBC flash memory controller activates said input/output interface circuit to receive the data file from the host computer, and to store the data file in a first physical address of said MBC flash memory device associated with a first logical address and transfer length received with a standard USB BOT write command issued from the host computer to the MBC flash memory controller;
        a data retrieving mode in which said MBC flash memory controller receives a standard USB BOT read command issued from the host computer including the first logical address and transfer length, and activates said input/output interface circuit to transmit the data file read from the first physical address of said MBC flash memory device associated with said first logical address to the host computer; and
        a data resetting mode in which data from one or more memory blocks is erased from the MBC flash memory device, wherein said data resetting mode is initiated and performed automatically by said MBC flash memory controller after receiving said standard USB BOT write command using arbitration logic and data that is entirely stored on said MBC flash memory device;
    (d) a ROM for storing boot code (BC) that provides initial executing sequences for said processor unit to initialize said MBC flash memory controller; and
    (e) a SRAM for storing look-up-tables (LUT) for translation of a logical address from said host computer and a MBC flash physical address for said programming mode and said retrieving mode operations,
    wherein the MBC flash memory controller further comprises arbitration logic including means for assigning each said physical address to its associated said logical address.

2. The MBC electronic data flash card according to claim 1, wherein the index comprises a write LUT and a read LUT, and the MBC flash memory controller further comprises means for updating the read LUT following an associated programming mode.

3. The MBC electronic data flash card according to claim 2, wherein the index further comprises a physical usage table (PUT) for performing physical sector mapping and for providing a bitmap indicating programmed sectors of the MBC flash memory device.

4. The MBC electronic data flash card according to claim 1, wherein the SRAM further comprises the write LUT, the read LUT and the PUT.

5. The MBC electronic data flash card according to claim 1, wherein the MBC flash memory controller further comprises a first-in-first-out (FIFO) unit for temporarily storing at least a portion of the data file before writing the data file to the MBC flash memory device.

6. The MBC electronic data flash card according to claim 1, wherein the MBC flash memory controller further comprises a second first-in-first-out (FIFO) unit utilized to recycle obsolete sectors of the MBC flash memory device.

7. The MBC electronic data flash card according to claim 1, wherein the MBC flash memory controller further comprises means for interfacing with the MBC flash memory device by way of SCSI protocols.

8. The MBC electronic data flash card according to claim 1, wherein the MBC flash memory device includes a first MBC flash memory device and a second MBC flash memory device, and
    wherein the MBC flash memory controller includes means for supporting at least one of dual-channel parallel access and interleave access to the first MBC flash memory device and the second MBC flash memory device.

9. The MBC electronic data flash card according to claim 1, wherein the MBC flash memory controller comprises one of a 8051, 8052, 80286, RISC, ARM, MIPS and a digital signal processor.

10. An electronic flash card adapted to be accessed by a host computer that is capable of establishing a communication link, said electronic flash card comprising:

a card body;

a flash memory device mounted on the card body, the flash memory device including a plurality of non volatile memory cells for storing a data file, said memory cells being arranged in at least one of a plurality of memory blocks, a plurality of pages, and a plurality of sectors;

an input/output interface circuit mounted on the card body for establishing communication with the host computer, wherein the input/output interface circuit includes a Universal Serial Bus (USB) interface circuit including means for transmitting said data file using a Bulk Only Transport (BOT) protocol; and a flash memory controller mounted on the card body and electrically connected to said flash memory device and said input/output interface circuit, wherein the flash memory controller comprises:

(a) means for determining whether the flash memory device is supported by a processing unit of the flash memory controller in accordance with a flash detection algorithm code, (b) an index for storing a plurality of logical addresses and a plurality of physical addresses such that each said physical address is assigned to an associated said logical address, where each said physical address corresponds to an associated plurality of memory cells of the flash memory device, and wherein the index comprises at least one look-up-table (LUT) for storing the logical addresses and the associated physical addresses, (c) means for selectively operating in one of:

a programming mode in which said flash memory controller activates said input/output interface circuit to receive the data file from the host computer, and to store the data file in a first physical address of said flash memory device associated with a first logical address and transfer length received with a standard USB BOT write command issued from the host computer to the flash memory controller;

a data retrieving mode in which said flash memory controller receives a standard USB BOT read command issued from the host computer including the first logical address and transfer length, and activates said input/output interface circuit to transmit the data file read from the first physical address of said flash memory device associated with said first logical address to the host computer; and a data resetting mode in which obsolete data previously written into one or more memory cells is erased from the flash memory device, wherein said data resetting mode is initiated and performed automatically by said flash memory controller after receiving said standard USB BOT write command using arbitration logic and data that is entirely stored on said flash memory device, wherein said data resetting mode includes utilizing a recycling first-in-first out (FIFO) circuit to perform recycle operations on said memory blocks containing said obsolete data, and wherein the flash memory controller further comprises arbitration logic including means for assigning each said physical address to its associated said logical address.

* * * * *

UNITED STATES PATENT AND TRADEMARK OFFICE
CERTIFICATE OF CORRECTION

| | | |
|---|---|---|
| PATENT NO. | : 7,702,831 B2 | Page 1 of 1 |
| APPLICATION NO. | : 11/466759 | |
| DATED | : April 20, 2010 | |
| INVENTOR(S) | : Ma et al. | |

It is certified that error appears in the above-identified patent and that said Letters Patent is hereby corrected as shown below:

On the title page, item (75) Inventors, please change "Ming-Shiang Shen, Taipei Hsien (TW)" to --Ming-Shiang Shen, Taipei (CN)--

Signed and Sealed this
Ninth Day of September, 2014

Michelle K. Lee
*Deputy Director of the United States Patent and Trademark Office*